(12) United States Patent
Salehi-Khojin et al.

(10) Patent No.: US 10,978,703 B2
(45) Date of Patent: Apr. 13, 2021

(54) CATALYST SYSTEM FOR ADVANCED METAL-AIR BATTERIES

(71) Applicant: Board of Trustees of the University of Illinois, Urbana, IL (US)

(72) Inventors: Amin Salehi-Khojin, Chicago, IL (US); Bijandra Kumar, Chicago, IL (US); Mohammad Asadi, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 33 days.

(21) Appl. No.: 15/534,912

(22) PCT Filed: Dec. 14, 2015

(86) PCT No.: PCT/US2015/065546
§ 371 (c)(1),
(2) Date: Jun. 9, 2017

(87) PCT Pub. No.: WO2016/100204
PCT Pub. Date: Jun. 23, 2016

(65) Prior Publication Data
US 2017/0373311 A1 Dec. 28, 2017

Related U.S. Application Data

(60) Provisional application No. 62/091,585, filed on Dec. 14, 2014.

(51) Int. Cl.
| | |
|---|---|
| *H01M 12/08* | (2006.01) |
| *H01M 4/38* | (2006.01) |
| *H01M 4/58* | (2010.01) |
| *H01M 10/052* | (2010.01) |
| *H01M 10/0569* | (2010.01) |
| *H01M 4/46* | (2006.01) |
| *H01M 4/40* | (2006.01) |
| *H01M 4/62* | (2006.01) |
| *H01M 4/88* | (2006.01) |

(52) U.S. Cl.
CPC .............. *H01M 4/466* (2013.01); *H01M 4/38* (2013.01); *H01M 4/382* (2013.01); *H01M 4/405* (2013.01); *H01M 4/581* (2013.01); *H01M 4/5815* (2013.01); *H01M 4/62* (2013.01); *H01M 4/88* (2013.01); *H01M 10/052* (2013.01); *H01M 10/0569* (2013.01); *H01M 12/08* (2013.01); *H01M 2300/0028* (2013.01); *Y02E 60/10* (2013.01)

(58) Field of Classification Search
CPC ........ H01M 4/38; H01M 4/382; H01M 4/405; H01M 4/466; H01M 4/581; H01M 4/5815; H01M 4/88; H01M 10/052; H01M 10/0569; H01M 12/06; H01M 12/08; H01M 2300/0028; Y02E 60/128
See application file for complete search history.

(56) References Cited

U.S. PATENT DOCUMENTS

| | | | |
|---|---|---|---|
| 4,414,080 A | 11/1983 | Williams et al. | |
| 2011/0027664 A1* | 2/2011 | Burchardt | B60L 11/1879 429/403 |
| 2013/2032965 | 12/2012 | Eastman et al. | |
| 2013/0008800 A1 | 1/2013 | Lakkaraju et al. | |
| 2013/0040210 A1* | 2/2013 | Mizuno | H01M 12/06 429/405 |
| 2013/0130141 A1* | 5/2013 | Matsuda | H01M 8/04201 429/429 |
| 2013/0143319 A1* | 6/2013 | Yu | C12M 33/04 435/375 |
| 2013/0157149 A1 | 6/2013 | Peled et al. | |
| 2013/0157174 A1 | 6/2013 | Masel et al. | |
| 2014/0342249 A1 | 11/2014 | He et al. | |

FOREIGN PATENT DOCUMENTS

| | | | |
|---|---|---|---|
| EP | 2495803 A1 | | 9/2012 |
| JP | 2008-066202 | * | 3/2008 |
| JP | 2012022935 A | | 2/2012 |
| WO | 2013/134418 A1 | | 9/2013 |

OTHER PUBLICATIONS

Machine translation of JP 2008-066202, published on Mar. 21, 2008 (Year: 2008).*
Molybdenum Disulfide (MoS2) Nanoparticles—Properties, Applications, AZoNano, Jul. 12, 2013 (Year: 2013).*
Feng, C., Ma, J., Li, H., Zeng, R., Guo, Z., Liu, H.—Synthesis of molybdenum disulfide(MoS2) for lithium ion battery applications, Materials Research Bulletin 44 (2009), pp. 1811-1815 (Year: 2009).*
Wikipedia—Nano Flake, 2018 (Year: 2018).*
Li, Y., Zhou, Z., Zhang, S., Chen, Z.—MoS2 Nanoribbons: High Stability and Unusual Electronic and Magnetic Properties, J. Am. Chem. Soc. 2008, 130, pp. 16739-16744 (Year: 2008).*
Sakaebe, H., Matsumoto, H.-N-Methyl-N-propylpiperidinium bis(trifluoromethanesulfonyl)imide (PP13-TFSI)-novel electrolyte base for Li battery, Electrochemistry Communications 5 (2003) pp. 594-598 (Year: 2003).*
Tungsten Disulfide (WS2) Nanoparticles—Properties, Applications, AZoNano, published on Jul. 8, 2013 (Year: 2013).*
Choi, C.L., Feng, J., Li, Y., Wu, J., Zak, A., Tenne, R., Dai, H.—WS2 nanoflakes from nanotubes for electrocatalysys, Nano Research, 2013, 6 (12), pp. 921-928 (Year: 2013).*
International Search Report dated Feb. 23, 2016 of PCT application No. PCT/US2015/065546 filed Dec. 14, 2015, 3 pages.
G.A. Elia et al., "An Advanced Lithium-Air Battery Exploiting an Ionic Liquid-Based Electrolyte," Nano Letters, 14(11), 6572-77 (2014).

* cited by examiner

*Primary Examiner* — Anca Eoff
(74) *Attorney, Agent, or Firm* — McDonnell Boehnen Hulbert & Berghoff LLP

(57) ABSTRACT

The disclosure relates generally to batteries. The disclosure relates more specifically to improved catalyst systems for metal-air batteries. A metal-air battery comprising: an anode comprising a metal; a cathode comprising at least one transition metal dichalcogenide; and an electrolyte in contact with the anode and the transition metal dichalcogenide of the cathode, wherein the electrolyte comprises at least 50% by weight of an ionic liquid, is disclosed herein.

23 Claims, 10 Drawing Sheets

US 10,978,703 B2

CATALYST SYSTEM FOR ADVANCED METAL-AIR BATTERIES

CROSS-REFERENCE TO RELATED APPLICATIONS

This application is a U.S. National Stage Application under 35 U.S.C. 371 of International Patent Application no. PCT/US2015/065546, which claims the benefit of priority of U.S. Provisional Patent Application No. 62/091,585, filed Dec. 14, 2014, which is hereby incorporated herein by reference in its entirety.

BACKGROUND OF THE DISCLOSURE

Field of the Disclosure

The disclosure relates generally to batteries. The disclosure relates more specifically to improved catalyst systems for metal-air batteries.

Description of Related Art

Metal-air batteries (e.g., lithium-air batteries) are considered as advanced solutions for the future energy storage system due to their high energy densities. For example, lithium-air (Li-air) batteries can have an energy density on the order of 11680 Wh/kg, which is close to the energy density of gasoline (~13000 Wh/kg) and much higher than that of Li-ion batteries (<200 Wh/kg). Such high energy density is due in large part to use of oxygen from the air instead of relying upon an internally-stored oxidizer. Fundamentally, energy density and rechargeability of the Li-air batteries are governed by the oxygen reduction reaction (ORR) and the oxygen evolution reaction (OER) rates at the cathode and their corresponding overpotentials. Numerous catalysts, such as carbon nanomaterials, noble metals, and metal oxides, have been used as catalysts for battery applications. Among these, doped carbon nanomaterials (e.g., graphene, carbon nanotubes) have demonstrated remarkable performance for the oxygen reduction reaction (ORR), but degradation during the charging process and poor catalytic activity with respect to the oxygen evolution reaction (OER) impedes the benefit of their ORR characteristics. Carbon-free catalysts, such as noble metals and metal oxides (e.g., $Co_3O_4$), have shown high stability and either superior ORR or OER performance, but typically not both, and furthermore are a rather costly solution. Recently, composite catalysts comprised of different noble metals have been used to develop efficient bi-functional catalysts enhancing both ORR and OER simultaneously, but these too present a costly alternative.

Improving the metal-air batteries to increase energy density and re-chargeability performance and decreasing costs remains a challenge in the art.

SUMMARY OF THE DISCLOSURE

This disclosure provides improved metal-air batteries having increased energy densities and rechargeability performance at decreased cost. In certain aspects, the present disclosure improves metal-air batteries that operate using a cathode that includes at least one transition metal dichalcogenide. In certain aspects, the methods of the disclosure can decrease operating and capital costs while maintaining or even improving energy density and re-chargeability. Without being bound to a particular theory, it is believed that the high density of d electrons available on TMDC-terminated edges (such as Mo-terminated edges) can participate in ORR electrochemical reduction reactions, in some embodiments resulting in superior catalytic performance as compared to noble metals. In addition, without being bound to a particular theory, it is believed that transition metal dichalcogenide and the ionic liquid function as a bi-functional co-catalyst system, demonstrating a strong synergistic effect. In certain embodiments, the metal-air batteries of the disclosure exhibit significantly higher oxygen reduction reaction (ORR) and oxygen evolution reaction (OER) performance compared to existing noble meal catalysts.

Thus, in one aspect, the disclosure provides a metal-air battery including:
 an anode comprising a metal;
 a cathode comprising at least one transition metal dichalcogenide; and
 an electrolyte in contact with the transition metal dichalcogenide of the cathode, and optionally with the metal of the anode,
wherein the electrolyte comprises at least 1% (e.g., at least 10%, at least 20%, at least 30% or at least 50%) of an ionic liquid.

The disclosure also provides methods of generating an electric potential, comprising:
 providing a metal-air battery as described herein;
 allowing oxygen to contact the cathode;
 allowing the metal of the anode to be oxidized to metal ions; and
 allowing the oxygen to be reduced at a surface of the transition metal dichalcogenide to form one or more metal oxides with the metal ions,
thereby generating the electrical potential between the anode and the cathode.

The disclosure also provides an electronic material comprising at least one transition metal dichalcogenides and an electrolyte in contact (e.g., in direct contact) with the transition metal dichalcogenides, the electrolyte comprising at least 1% (e.g., at least 10%, at least 20%, at least 30% or at least 50%) of an ionic liquid.

These and other features and advantages of the present invention will be more fully understood from the following detailed description taken together with the accompanying claims. It is noted that the scope of the claims is defined by the recitations therein and not by the specific discussion of features and advantages set forth in the present description.

DETAILED DESCRIPTION OF THE DISCLOSURE

Figure 1:
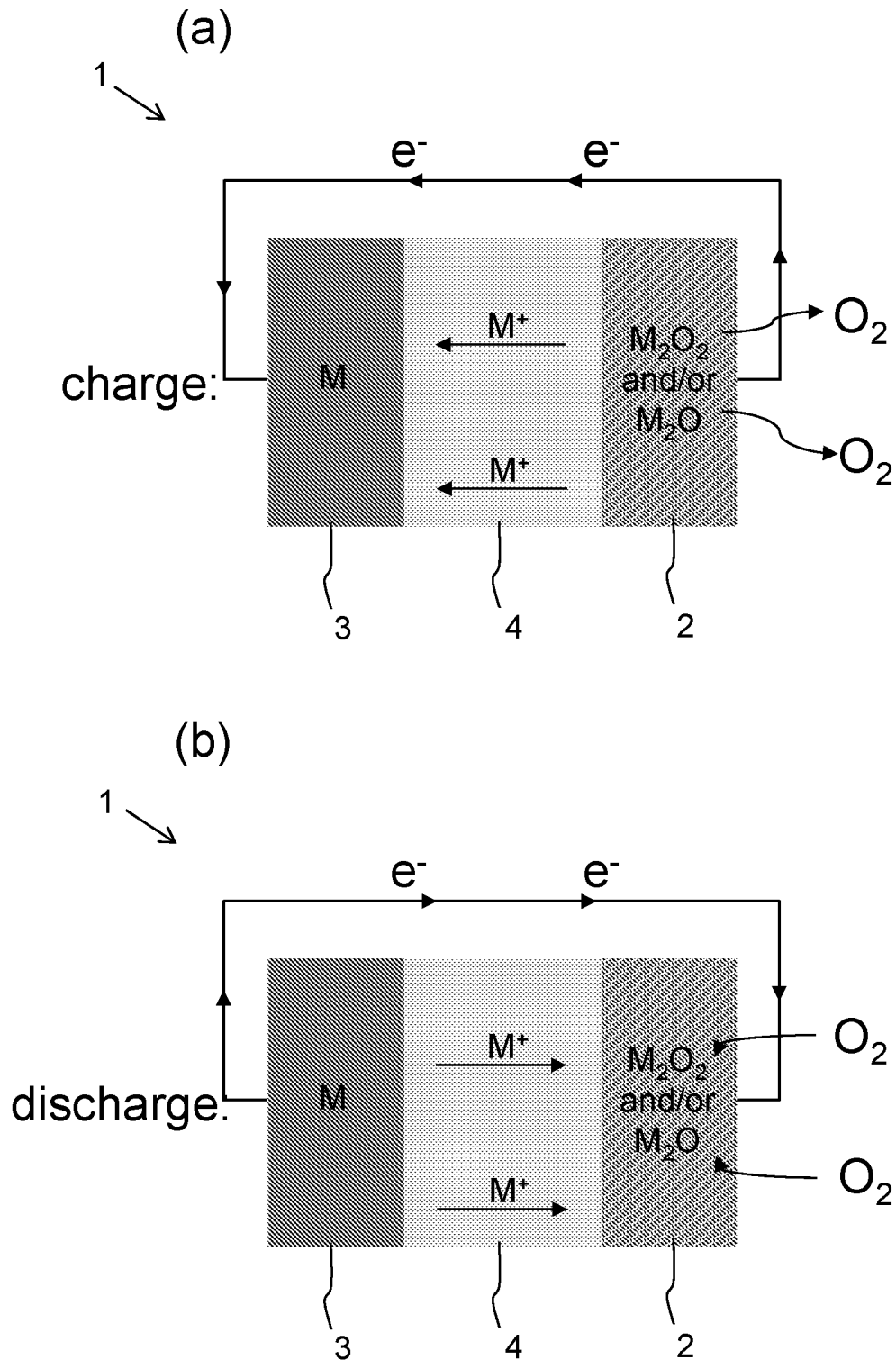
FIG. 1 is a schematic view of (a) charge and (b) discharge cycles of a metal-air battery according to one embodiment of the disclosure.

Before the disclosed devices, methods and compositions are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the term "contacting" includes the physical contact of at least one substance to another substance.

As used herein, the term "overpotential" refers to the potential (voltage) difference between a reaction's thermodynamically determined reduction or oxidation potential and the potential at which the event is experimentally observed.

All percentages, ratios and proportions herein are by weight, unless otherwise specified. A weight percent (weight %, also as wt %) of a component, unless specifically stated to the contrary, is based on the total weight of the composition in which the component is included (e.g., the amount of the ionic liquid).

In view of the present disclosure, the methods and compositions described herein can be configured by the person of ordinary skill in the art to meet the desired need. In general, the disclosed methods and compositions provide improvements in electrochemical devices, such as metal-air batteries, that utilize the oxidation and/or reduction reaction of molecular oxygen. For example, in certain aspects, the devices and methods of the disclosure offer improvements with respect to the oxygen reduction reaction (ORR) (i.e., relevant to the discharge of the battery to provide an electrical potential), and/or with respect to the oxygen evolution reaction (OER) (i.e., relevant to the charging of the battery with an external potential). In certain aspects, the devices and methods described herein exhibit high stability, cycle life, and power. Specifically, in certain aspects of the disclosure, the cathode comprising a transition metal dichalcogenide (TMDC), such as molybdenum disulfide ($MoS_2$), exhibits an oxygen reduction reaction (ORR) current density at least one order of magnitude higher (e.g., 10-100 times, 10-50 times, 10-30 times, or 10-20 times higher) when the cathode is in contact with an ionic liquid electrolyte than when the cathode is in contact with conventional organic solvents (such as DMSO). In addition, the cathode comprising a TMDC in contact with an electrolyte comprising an ionic liquid also can also exhibit significantly higher ORR and/or OER performance compared to existing noble meal catalysts.

In general, the disclosure provides electrochemical materials and devices, such as metal-air batteries, that can utilize an oxidation-reduction reaction of oxygen. Typically, metal-air batteries contain an anode, a cathode and an electrolyte in contact with the anode and the cathode. FIG. 1 is a schematic cross-sectional view of a rechargeable metal-air battery according to one embodiment of the present disclosure. The metal-air battery 1 has a cathode 2 that comprises at least one transition metal dichalcogenide, an anode 3 comprising a metal, an electrolyte 4 in contact with the metal of the anode 3 and the at least one transition metal dichalcogenide of the cathode 2. In use, the electrolyte can conduct ions between the cathode 2 and the anode 3. As generally described elsewhere herein, the electrolyte includes at least 1% by weight (e.g., at least 10%, at least 20%, at least 30% or even at least 50%) of an ionic liquid.

Catalysts can be in contact on the anode, or cathode, or in the electrolyte to promote desired chemical reactions. In the devices of the disclosure, for example, the cathode comprises a transition metal dichalcogenide (such as $MoS_2$), and the electrolyte comprises the ionic liquid. The reaction with oxygen (e.g., from air) occurs at a surface of the transition metal dichalcogenide of the cathode, which can thus be referred to as an "oxygen positive electrode".

In some embodiments of the disclosure, especially where the electrochemical performance of a system is to be measured, a three-component electrochemical cell may be used. In a three-component cell a working electrode (WE), counter electrode (CE) and a reference electrode (RE) are in contact with an electrolyte comprising the ionic liquid. In certain embodiments of the disclosure, for example, the WE serves as a cathode and comprises the transition metal dichalcogenide. In a non-limiting example, silver wire may be used as the RE, platinum net may be used as the CE, and the WE may comprise the transition metal dichalcogenide (such as $MoS_2$). In such cases, the metal to be oxidized can be provided, for example, on the platinum counter electrode.

In a metal-air battery, during discharging, the metal of the anode (e.g., Li) is oxidized for form metal ions (e.g., $Li^+$):

$$2M \rightarrow 2M^+ + 2e^-$$

The electrons generated reach a cathode via an external load circuit (i.e., the device to be powered by the battery). The electrons reduce molecular oxygen at a surface of the transition metal dichalcogenide of the cathode; the reduced oxygen species combines with metal ions from the electrolyte to form metal oxide products, such as lithium oxide ($Li_2O$) or lithium peroxide ($Li_2O_2$), which can deposit at the cathode:

$$2M^+ + \tfrac{1}{2}O_2 + 2e^- \rightarrow M_2O$$

$$2M^+ + O_2 + 2e^- \rightarrow M_2O_2$$

The flow of electrons from the negative electrode to the positive electrode through the load circuit can be harnessed to produce power.

During charging under an external potential, this process is reversed. Electrons flow from the cathode to the anode to reverse these half-cell reactions, and the metal (e.g., Li) is regenerated at the anode, thereby enabling re-discharging:

$$2M^+ + 2e^- \rightarrow M$$

$$M_2O \rightarrow 2M^+ + 2e^- + \tfrac{1}{2}O_2$$

$$M_2O_2 \rightarrow 2M^+ + 2e^- + O_2$$

As described above, in the devices and methods of the disclosure, the anode includes the metal (i.e., the metal that is oxidized in the electrochemical reaction). As the person of ordinary skill will appreciate, a variety of constructions are available for the anode. The anode can, for example, consist essentially of the metal (e.g., as a bar, plate, or other shape). In other embodiments, the anode can be formed from an alloy of the metal, or can be formed as a deposit of the metal on a substrate (e.g., a substrate formed from a different metal, or from another conductive material). As the person of ordinary skill in the art will appreciate, other materials that include the metal in its zero-valence state can be used. For example, in certain embodiments, the metal can be provided as part of a compound metal oxide or carbonaceous material from which the metal can be reduced to provide metal ion and one or more electrons.

Although lithium is often used as the metal of the anode, other embodiments of the disclosure are directed to metal-air batteries utilizing other anode metals described herein. Accordingly, it should be understood that the descriptions herein with reference to a lithium-air or Li—$O_2$ battery are by way of example only, and in other embodiments of the disclosure, other metals are used instead of and/or in addition to lithium, including those described herein. Metals suitable for use in the anode of the disclosure include, but are not limited to alkaline metals such as lithium, sodium and potassium, alkaline-earth metals such as magnesium and calcium, group 13 elements such as aluminum, transition metals such as zinc, iron and silver, and alloy materials that contain any of these metals or materials that contain any of these metals. In particular embodiments, the metal is selected from one or more of lithium, magnesium, zinc, and aluminum. In other particular embodiments, the metal is lithium.

When lithium is used as the metal of the anode, a lithium-containing carbonaceous material, an alloy that contains a lithium element, or a compound oxide, nitride or sulfide of lithium may be used. Examples of the alloy that contains a lithium element include, but are not limited to, lithium-aluminum alloys, lithium-tin alloys, lithium-lead alloys, and lithium-silicon alloys. Examples of lithium-containing compound metal oxides include lithium titanium oxide. Examples of lithium-containing compound metal nitrides include lithium cobalt nitride, lithium iron nitride and lithium manganese nitride.

As described above, the cathodes of the devices and methods of the disclosure include at least one transition metal dichalcogenide. One or more of the transition metal dichalcogenide used in the methods and devices of the disclosure can be selected to catalyze the reduction of oxygen via an electrochemical reaction. Examples of transition metal dichalcogenides include those selected from group consisting of $TiX_2$, $VX_2$, $CrX_2$, $ZrX_2$, $NbX_2$, $MoX_2$, $HfX_2$, $WX_2$, $TaX_2$, $TcX_2$, and $ReX_2$, wherein X is independently S, Se, or Te. In one embodiment, each transition metal dichalcogenide is selected from the group consisting of $TiX_2$, $MoX_2$, and $WX_2$, wherein X is independently S, Se, or Te. In another embodiment, each transition metal dichalcogenide is selected from the group consisting of $TiS_2$, $TiSe_2$, $MoS_2$, $MoSe_2$, $WS_2$ and $WSe_2$. For example, in one embodiment, each transition metal dichalcogenide is $TiS_2$, $MoS_2$, or $WS_2$. In another embodiment, each transition metal dichalcogenide is $MoS_2$ or $MoSe_2$. The transition metal dichalcogenide may be $MoS_2$ in one embodiment.

Figure 6:
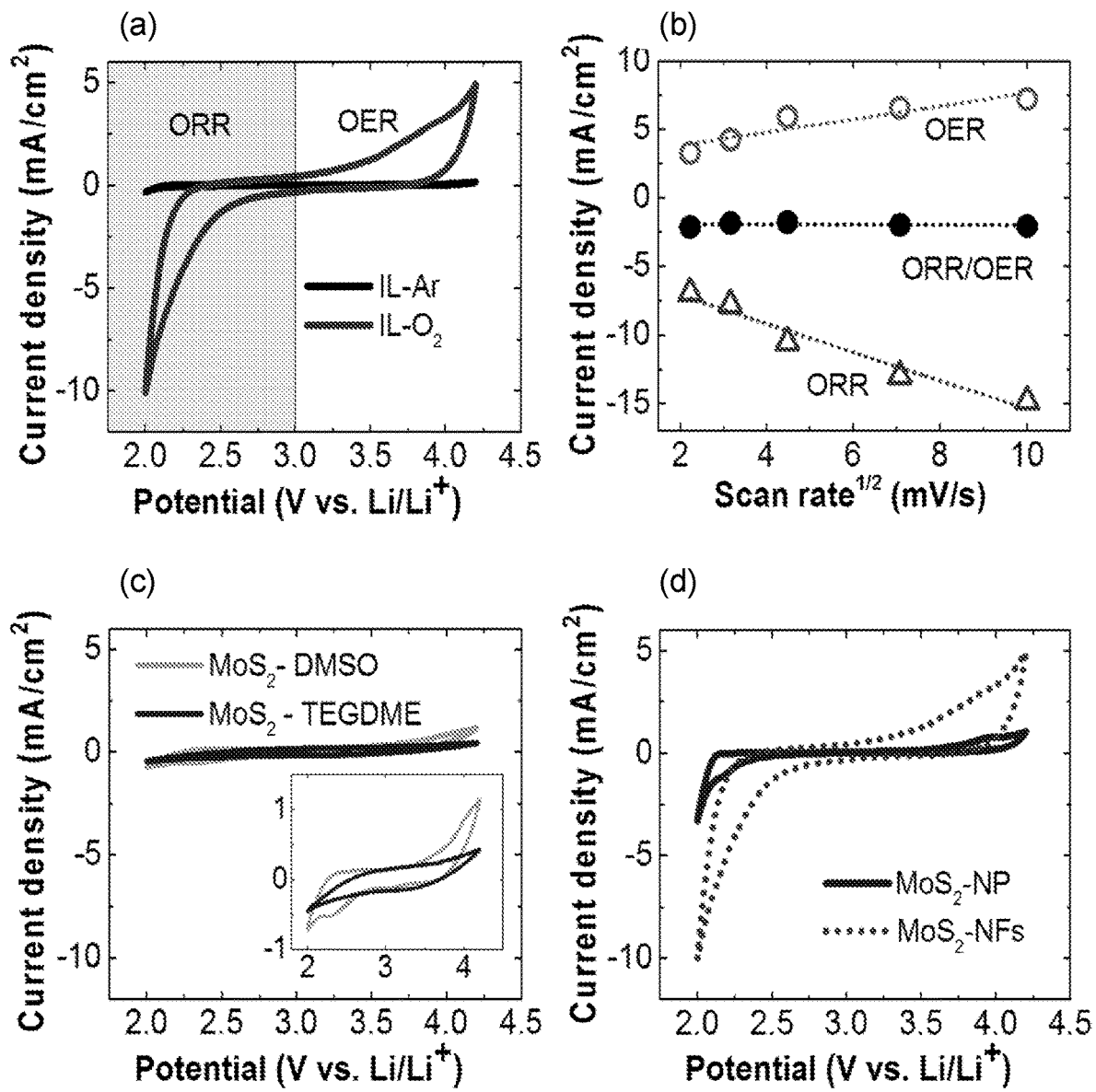
FIG. 6 illustrates cyclic voltammetry (CV) studies of $MoS_2$ nanoflakes. (a) CV curves obtained in $O_2$— and Ar-saturated ionic liquids; the shallower curve is for the Ar-saturated case. (b) Current densities at 2.0 and 4.2 V vs $Li/Li^+$ vs. square root of scan rate. (c) ORR and OER performance of $MoS_2$ nanoflakes in $O_2$-saturated dimethylsulfoxide (DMSO) and tetraethyleneglycol dimethylether (TEGDME); the shallower curve is for the TEGDME case. (d) Comparison of $MoS_2$ nanoflake performance with that of $MoS_2$ nanoparticles ($MoS_2$ NPs).

The at least one transition metal dichalcogenide itself can be provided in a variety of forms, for example, as a bulk material, in nanostructure form, as a collection of particles, and/or as a collection of supported particles. As the person of ordinary skill in the art will appreciate, the TMDC in bulk form may have a layered structure as is typical for such compounds. The TMDC may have a nanostructure morphology, including but not limited to monolayers, nanotubes, nanoparticles, nanoflakes (e.g., multilayer nanoflakes), nanosheets, nanoribbons, nanoporous solids etc. As used herein, the term "nanostructure" refers to a material with a dimension (e.g., of a pore, a thickness, a diameter, as appropriate for the structure) in the nanometer range (i.e., greater than 1 nm and less than 1 μm). In some embodiments, the transition metal dichalcogenide is layer-stacked bulk TMDC with metal atom-terminated edges (e.g., $MoS_2$ with molybdenum-terminated edges). In other embodiments, TMDC nanoparticles (e.g., $MoS_2$ nanoparticles) may be used in the devices and methods of the disclosure. In other embodiments, TMDC nanoflakes (e.g., nanoflakes of $MoS_2$) may be used in the devices and methods of the disclosure. Nanoflakes can be made, for example, via liquid exfoliation, as described in Coleman, J. N. et al. Two-dimensional nanosheets produced by liquid exfoliation of layered materials. Science 331, 568-71 (2011) and Yasaei, P. et al. High-Quality Black Phosphorus Atomic Layers by Liquid-Phase Exfoliation. Adv. Mater. (2015) (doi:10.1002/adma.201405150), each of which is hereby incorporated herein by reference in its entirety. In other embodiments, TMDC nanoribbons (e.g., nanoribbons of $MoS_2$) may be used in the devices and methods of the disclosure. In other embodiments, TMDC nanosheets (e.g., nanosheets of $MoS_2$) may be used in the devices and methods of the disclosure. The person of ordinary skill in the art can select the appropriate morphology for a particular device. For example, in certain devices of the disclosure, a TMDC in nanoflake form can outperform the same TMDC in nanoparticle form with respect to ORR and OER current densities (see, e.g., the results described with respect to FIG. 6).

In certain embodiments, the transition metal dichalcogenide nanostructures (e.g., nanoflakes, nanoparticles, nanoribbons, etc.) have an average size between about 1 nm and 1000 nm. The relevant size for a nanoparticle is its largest diameter. The relevant size for a nanoflake is its largest width along its major surface. The relevant size for a nanoribbon is its width across the ribbon. The relevant size for a nanosheet is its thickness. In some embodiments, the transition metal dichalcogenide nanostructures have an average size between from about 1 nm to about 400 nm, or about 1 nm to about 350 nm, or about 1 nm to about 300 nm, or about 1 nm to about 250 nm, or about 1 nm to about 200 nm, or about 1 nm to about 150 nm, or about 1 nm to about 100 nm, or about 1 nm to about 80 nm, or about 1 nm to about 70 nm, or about 1 nm to about 50 nm, or 50 nm to about 400 nm, or about 50 nm to about 350 nm, or about 50 nm to about 300 nm, or about 50 nm to about 250 nm, or about 50 nm to about 200 nm, or about 50 nm to about 150 nm, or about 50 nm to about 100 nm, or about 10 nm to about 70 nm, or about 10 nm to about 80 nm, or about 10 nm to about 100 nm, or about 100 nm to about 500 nm, or about 100 nm to about 600 nm, or about 100 nm to about 700 nm, or about 100 nm to about 800 nm, or about 100 nm to about 900 nm, or about 100 nm to about 1000 nm, or about 400 nm to about 500 nm, or about 400 nm to about 600 nm, or about 400 nm to about 700 nm, or about 400 nm to about 800 nm, or about 400 nm to about 900 nm, or about 400 nm to about 1000 nm. In certain embodiments, the transition metal dichalcogenide nanostructures have an average size between from about 1 nm to about 200 nm. In certain other embodiments, the transition metal dichalcogenide nanostructures have an average size between from about 1 nm to about 400 nm. In certain other embodiments, the transition metal dichalcogenide nanostructures have an average size between from about 400 nm to about 1000 nm. In certain embodiments, the transition metal dichalcogenide nanostructures are nanoflakes having an average size between from about 1 nm to about 200 nm. In certain other embodiments, the transition metal dichalcogenide nanoflakes have an average size between from about 1 nm to about 400 nm. In certain other embodiments, the transition metal dichalcogenide nanoflakes have an average size between from about 400 nm to about 1000 nm.

In certain embodiments, transition metal dichalcogenide nanoflakes have an average thickness between about 1 nm and about 100 μm (e.g., about 1 nm to about 10 μm, or about 1 nm to about 1 μm, or about 1 nm to about 1000 nm, or about 1 nm to about 400 nm, or about 1 nm to about 350 nm, or about 1 nm to about 300 nm, or about 1 nm to about 250 nm, or about 1 nm to about 200 nm, or about 1 nm to about 150 nm, or about 1 nm to about 100 nm, or about 1 nm to about 80 nm, or about 1 nm to about 70 nm, or about 1 nm to about 50 nm, or about 50 nm to about 400 nm, or about 50 nm to about 350 nm, or about 50 nm to about 300 nm, or about 50 nm to about 250 nm, or about 50 nm to about 200 nm, or about 50 nm to about 150 nm, or about 50 nm to about 100 nm, or about 10 nm to about 70 nm, or about 10 nm to about 80 nm, or about 10 nm to about 100 nm, or about 100 nm to about 500 nm, or about 100 nm to about 600 nm, or about 100 nm to about 700 nm, or about 100 nm to about 800 nm, or about 100 nm to about 900 nm, or about 100 nm to about 1000 nm, or about 400 nm to about 500 nm, or about 400 nm to about 600 nm, or about 400 nm to about 700 nm, or about 400 nm to about 800 nm, or about 400 nm to about 900 nm, or about 400 nm to about 1000 nm); and an average dimensions along the major surface of about 20 nm to about 100 μm (e.g., about 20 nm to about 50 μm, or about 20 nm to about 10 μm, or about 20 nm to about 1 μm, or about 50 nm to about 100 μm, or about 50 nm to about 50 μm, or about 50 nm to about 10 μm, or about 50 nm to about 1 μm, or about 100 nm to about 100 μm, or about 100 nm to about 50 μm, or about 100 nm to about 10 μm, or about 100 nm to about 1 µm). The aspect ratio (largest major dimension:thickness) of the nanoflakes can be on average, for example, at least about 5:1, at least about 10:1 or at least about 20:1. For example, in certain embodiments the transition metal dichalcogenide nanoflakes have an average thickness in the range of about 1 nm to about 1000 nm (e.g., about 1 nm to about 100 nm), average dimensions along the major surface of about 50 nm to about 10 µm, and an aspect ratio of at least about 5:1.

One of skill in the art will recognize that the at least one transition metal dichalcogenide of the cathode may be provided in a variety of forms, provided that it is in contact with the electrolyte. For example, the transition metal dichalcogenide can be disposed on a substrate. For example, the transition metal dichalcogenide can be disposed on a porous member, which can allow gas (e.g., air or oxygen) to diffuse through the member to the TMDC. The porous member may be electrically-conductive. In cases where the porous member is not electrically conductive, the person of skill in the art can arrange for the electrical connection of the cathode to be made to some other part of the cathode. The substrate may be selected to allow oxygen (e.g., air) to be absorbed in a substantial quantity into the device and transmitted to the TMDC, Examples of the porous materials for the substrate include carbon-based materials, such as carbon as well as carbon blacks (e.g., Ketjen black, acetylene black, channel black, furnace black, and mesoporous carbon), activated carbon and carbon fibers. In one embodiment, a carbon material with a large specific surface area is used. A material with a pore volume on the order of 1 mL/g can be used. In another case, a cathode can be prepared by mixing TMDC with conductive material (e.g. SUPER P brand carbon black) and binder (e.g., PTFE) followed by coating on a current collector (e.g., aluminum mesh). The ratio of these elements can generally vary. In various embodiments, the TMDC-containing cathode material (e.g., material that is coated onto a current collector) includes at least 10 wt %, at least 20 wt %, at least 50 wt %, at least 70 wt %, 10-99 wt %, 20-99 wt %, 50-99 wt %, 10-95 wt %, 20-95 wt %, 50-95 wt %, 10-70 wt %, 20-70 wt %, 40-70 wt % or 70-99 wt % TMDC. In certain embodiments, it can be 95 wt % TMDC, 4 wt % PTFE binder and 5 wt % super P; or 50 wt % TMDC, 40 wt % PTFE binder and 10 wt % super P.

The TMDC-containing material can be coated onto a current collector or a porous member at any convenient thickness, e.g., in thicknesses up to 1000 µm. The overall cathode desirably has some porosity so that oxygen can be provided to the TMDC material.

Figure 2:
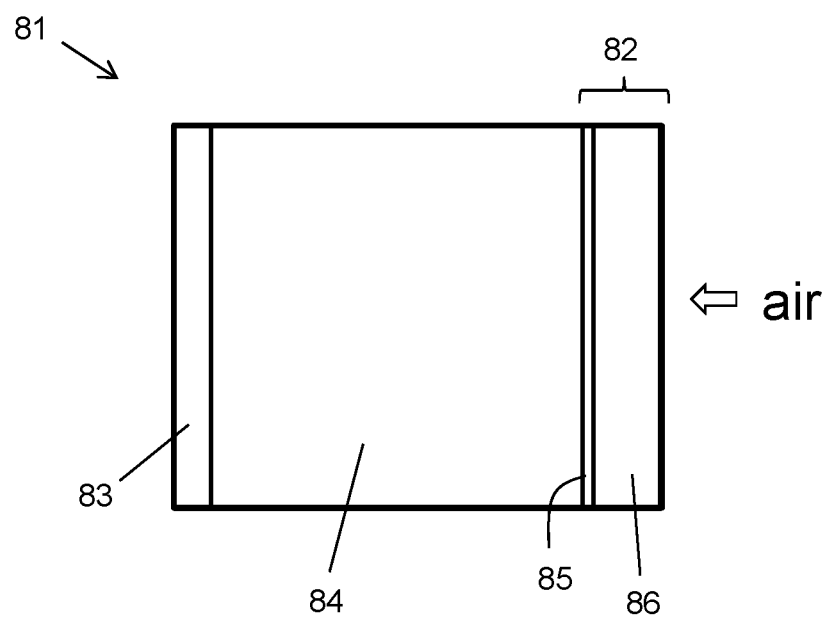
FIG. 2 is a schematic view of a metal-air battery according to another embodiment of the disclosure.

One particular architecture for a metal-air battery using a cathode including a porous substrate is shown in FIG. 2. Battery 81 includes a cathode 82 and an anode 83. Cathode 82 includes a porous member 86 with a transition metal dichalcogenide 85 disposed on a surface thereof. The porous member 86 allows air to diffuse through to the electrolyte/TMDC interface. The anode and the cathode can be connected to an external circuit (e.g., a circuit to be powered by the battery, or a circuit to provide a potential to charge the battery).

One of skill in the art would be able to optimize the amount of the TMDC present in the gas diffusion material present at the cathode.

As described above, in the devices and methods of the disclosure the electrolyte comprises at least 1% of an ionic liquid. One of skill in the art will also recognize that the term "ionic liquid" refers to an ionic substance (i.e., a combination of a cation and an anion) that is liquid at standard temperature and pressure (25° C., 1 atm). In certain embodiments, the ionic liquid is a compound comprising at least one positively charged nitrogen, sulfur, or phosphorus group (for example, a phosphonium or a quaternary amine). In certain embodiments, the electrolyte comprises at least 10%, at least 20%, at least 50%, at least 70%, at least 85%, at least 90% or even at least 95% ionic liquid.

Specific examples of ionic liquids include, but are not limited to, one or more of salts of: acetylcholines, alanines, aminoacetonitriles, methylammoniums, arginines, aspartic acids, threonines, chloroformamidiniums, thiouroniums, quinoliniums, pyrrolidinols, serinols, benzamidines, sulfamates, acetates, carbamates, inflates, and cyanides. The person of ordinary skill in the art will select such salts that are in liquid form at standard temperature and pressure. These examples are meant for illustrative purposes only, and are not meant to limit the scope of the present disclosure.

In some embodiments, the ionic liquid of the disclosure may be an imidazolium salt, such as 1-ethyl-3-methylimidazolium tetrafluoroborate, 1-ethyl-3-methylimidazolium bis(trifluoromethanesulfonyl)imide, 1-ethyl-3-methylimidazolium trifluoromethanesulfonate, 1-butyl-3-methylimidazolium tetrafluoroborate, 1-butyl-3-methylimidazolium bis (trifluoromethanesulfonyl)imide, or 1-butyl-3-methylimidazolium trifluoromethanesulfonate; a pyrrolidinium salt, such as 1-butyl-1-methylpyrrolidinium tetrafluoroborate, 1-butyl-1-methylpyrrolidinium bis(trifluoromethanesulfonyl)imide, or 1-butyl-1-methylpyrrolidinium trifluoromethanesulfonate; a piperidinium salt, such as 1-butyl-1-methylpiperidinium tetrafluoroborate, 1-butyl-1-methylpiperidinium bis(trifluoromethanesulfonyl)imide, or 1-butyl-1-methylpiperidinium trifluoromethanesulfonate; an ammonium salt, such as amyltriethylammonium bis (trifluoromethanesulfonyl)imide, or methyltri-n-octylammonium bis(trifluoromethanesulfonyl)imide; or a pyridinium salt, such as 1-ethyl-3-methylpyridinium bis (trifluoromethanesulfonyl)imide.

In certain embodiments, the ionic liquids of the disclosure include, but are not limited to imidazoliums, pyridiniums, pyrrolidiniums, phosphoniums, ammoniums, sulfoniums, prolinates, and methioninates salts. The anions suitable to form salts with the cations include, but are not limited to $C_1$-$C_6$ alkylsulfate, tosylate, methanesulfonate, bis(trifluoromethylsulfonyl)imide, hexafluorophosphate, tetrafluoroborate, triflate, halide, carbamate, and sulfamate. In particular embodiments, the ionic liquid may be a salt of the cations selected from those illustrated below:

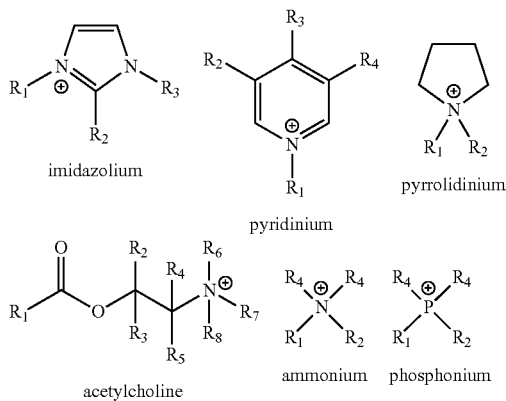

imidazolium pyridinium pyrrolidinium acetylcholine ammonium phosphonium

-continued

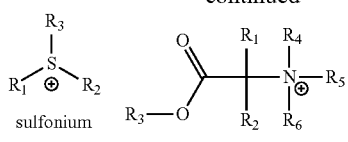
sulfonium    alanine

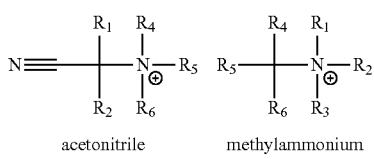
acetonitrile    methylammonium    Choline

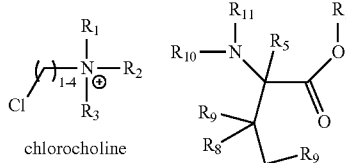
chlorocholine

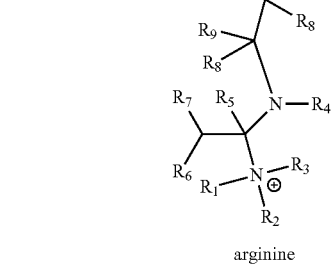
arginine

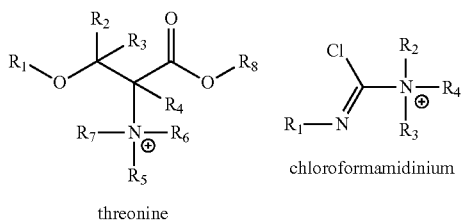
aspartic acid

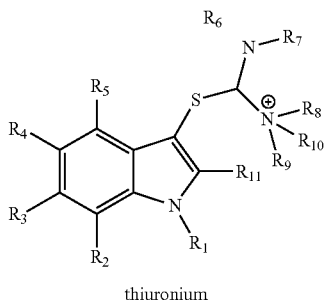
threonine    chloroformamidinium

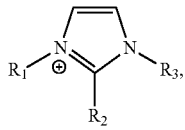
thiuronium

-continued

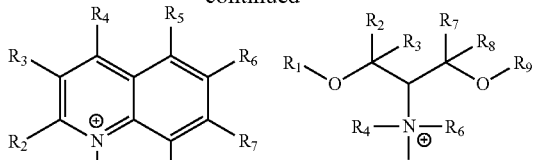
propulisoquinolinium    Serinol benzamidine    sarcosines wherein $R_1$-$R_{12}$ are independently selected from the group consisting of hydrogen, —OH, linear aliphatic $C_1$-$C_6$ group, branched aliphatic $C_1$-$C_6$ group, cyclic aliphatic $C_1$-$C_6$ group, —CH$_2$OH, —CH$_2$CH$_2$OH, —CH$_2$CH$_2$CH$_2$OH, —CH$_2$CHOHCH$_3$, —CH$_2$COH, —CH$_2$CH$_2$COH, and —CH$_2$COCH$_3$.

In certain embodiments, the ionic liquid of the methods and metal-air batteries of the disclosure is imidazolium salt of formula:

$$\underset{R_2}{\overset{R_1-N\oplus\diagdown\diagup N-R_3,}{\phantom{X}}}$$

wherein $R_1$, $R_2$, and $R_3$ are independently selected from the group consisting of hydrogen, linear aliphatic $C_1$-$C_6$ group, branched aliphatic $C_1$-$C_6$ group, and cyclic aliphatic $C_1$-$C_6$ group. In other embodiments, $R_2$ is hydrogen, and $R_1$ and $R_3$ are independently selected from linear or branched $C_1$-$C_4$ alkyl. In particular embodiments, the ionic liquid of the disclosure is an 1-ethyl-3-methylimidazolium salt. In other embodiments, the ionic liquid of the disclosure is 1-ethyl-3-methylimidazolium tetrafluoroborate (EMIM-BF$_4$).

Of course, not every substance that forms a complex with $O_2^-$ will act as an ionic liquid. When an intermediate binds to an ionic liquid, the reactivity of the intermediate decreases. If the intermediate bonds too strongly to the ionic liquid the intermediate will become unreactive, so the substance will not be effective. The person of ordinary skill in the art will understand that this can provides a key limitation on substances that act as ionic liquids, and will select the ionic liquid accordingly.

In general, a person of skill in the art can determine whether a given ionic liquid is a co-catalyst for a reaction (R) catalyzed by TMDC as follows:
(a) fill a standard 3 electrode electrochemical cell with the electrolyte commonly used for reaction R. Common electrolytes include such as 0.1 M sulfuric acid or 0.1 M KOH in water can also be used;
(b) mount the TMDC into the 3 electrode electrochemical cell and an appropriate counter electrode;
(c) run several CV cycles to clean the cell;

(d) measure the reversible hydrogen electrode (RHE) potential in the electrolyte;

(e) load the reactants for the reaction R into the cell, and measure a CV of the reaction R, noting the potential of the peak associated with the reaction R;

(f) calculate V1, which is the difference between the onset potential of the peak associated with reaction and RHE;

(g) calculate V1A, which is the difference between the maximum potential of the peak associated with reaction and RHE;

(h) add 0.0001 to 99.9999 weight % of the ionic liquid to the electrolyte;

(i) measure RHE in the reaction with ionic liquid;

(j) measure the CV of reaction R again, noting the potential of the peak associated with the reaction R;

(k) calculate V2, which is the difference between the onset potential of the peak associated with reaction and RHE; and (l) calculate V2A, which is the difference between the maximum potential of the peak associated with reaction and RHE.

If V2<V1 or V2A<V1A at any concentration of the ionic liquid (e.g., between 0.0001 and 99.9999 weight %), the ionic liquid is a co-catalyst for the reaction.

In some embodiments, the ionic liquid is present in the electrolyte within the range from about 50 weight % to about 100 weight %, or about 50 weight % to about 99 weight %, or about 50 weight % to about 98 weight %, or about 50 weight % to about 95 weight %, or about 50 weight % to about 90 weight %, or about 50 weight % to about 80 weight %, or about 50 weight % to about 70 weight %, or about 50 weight % to about 60 weight %, or about 80 weight % to about 99 weight %, from about 80 weight % to about 98 weight %, or about 80 weight % to about 95 weight %, or about 80 weight % to about 90 weight %, or about 70 weight % to about 99 weight %, from about 70 weight % to about 98 weight %, or about 70 weight % to about 95 weight %, or about 70 weight % to about 90 weight %, or about 70 weight % to about 80 weight %, or about 50 weight %, or about 70 weight %, or about 80 weight %, or about 90 weight %, or about 95 weight %, or about 96 weight %, or about 97 weight %, or about 98 weight %, or about 99 weight of the aqueous solution. In certain embodiments, the ionic liquid is present in the electrolyte within the range from about 75 weight % to about 100 weight %, or about 90 weight % to about 100 weight %. In some other embodiments, the ionic liquid is present in an electrolyte at about 90 weight %. In other embodiments, the electrolyte consists essentially of the ionic liquid.

In certain embodiments, the electrolyte may further include water or other aqueous solution, a solvent, a buffer solution, an additive to a component of the system, or a solution that is bound to at least one of the catalysts in a system. Some suitable solvents include, but are not limited to dioxolane, dimethylsulfoxide (DMSO), tetraethyleneglycol dimethylether (TEGDME), dimethyl carbonate (DMC), diethylcarbonate (DEC), di propylcarbonate (DPC), ethyl methylcarbonate (EMC), ethylene carbonate (EC), propylene carbonate (PC), tetrahydrofuran (THF), butylene carbonate, lactones, esters, glymes, sulfoxides, sulfolanes, polyethylene oxide (PEO) and polyacrylnitrile (PAN), alone or in any combination. In certain embodiments, water or non-ionic liquid organic solvents are present in an amount of less than about 40 weight %, less than about 30 weight %, less than about 20 weight %, less than about 10 weight %, less than about 5 weight %, or even less than about 1 weight %. In certain embodiments, the electrolyte is substantially free of water or non-ionic liquid organic solvents.

In certain embodiments, the electrolyte may further comprise other species, such as acids, bases, and salts. For example, the electrolyte may include a salt of the metal of the anode (e.g., when the anode includes metallic lithium, the electrolyte may include a lithium salt, such as lithium perchlorate, lithium bis(trifluoromethanesulfonyl)imide, lithium hexafluorophosphate, lithium triflate, Lithium hexafluoroarsenate, etc.). In certain embodiments, the salt of the metal of the anode is present in a concentration in the range of about 0.005 M to about 5 M, about 0.01 M to about 1 M, or about 0.02 M to about 0.5 M. The inclusion of such other species would be evident to the person of ordinary skill in the art depending on the desired electrochemical and physicochemical properties to the electrolyte, and are not meant to limit the scope of the present disclosure.

The metal-air battery of the disclosure may optionally include a membrane (e.g., disposed between the anode and the cathode). The person of ordinary membrane is not specifically limit. For example, a polymeric non-woven fabric, such as polypropylene non-woven fabric or polyphenylene sulfide non-woven fabric, a microporous film of an olefin resin, such as polyethylene or polypropylene, or a combination thereof may be used. One of skill in the art will recognize if a membrane might be used in the devices and methods of the disclosure, depending on the desired use.

The devices may optionally include a membrane (e.g., disposed between the anode and the cathode, not shown), as is common in many electrochemical cells; in such case, the electrolytes on either side of the membrane are considered to be in contact with both the anode and the cathode. Thus, in a device with a membrane, the electrolyte on the side of the cathode should include an ionic liquid; it is not necessary to include an ionic liquid in the electrolyte on the side of the anode. However, the ionic liquid-containing electrolyte is in direct contact with the TMDC.

The metal air battery may be housed in any desirable casing or enclosure (not shown). For example, materials that are conventionally used as exterior materials for batteries, such as a metal can, resin or laminate package, can be used as the exterior material for the metal-air battery of the disclosure. The exterior material may include holes formed therein, in fluid communication with the TMDC, through which oxygen is supplied to the battery. For example, the exterior material may have holes that in fluid communication with a porous member of the cathode, to allow air to contact the TMDC.

Advantageously, the oxygen used in the embodiments of the disclosure can be obtained from any source, e.g., dry air, pure oxygen, or atmospheric air. Accordingly, the metal-air batteries disclosed herein may also be characterized as "metal-$O_2$ batteries." In certain embodiments, the metal-air battery of the disclosure may include an oxygen permeation membrane. The oxygen permeation membrane may be provided on the cathode on the side opposite the electrolyte and in contact with air. As the oxygen permeation membrane, a water-repellent porous membrane which allows oxygen in the air to pass through and can prevent ingress of moisture, for example, may be used (e.g., such as a porous membrane of polyester or polyphenylene sulfide). A water-repellent membrane may be separately provided.

The metal-air batteries described herein may be used singularly or in combination, and may be integrated into or with various systems or devices to improve efficiency and address energy demands in a wide range of applications. For example, the metal-air batteries may be used in large systems and devices (e.g., power levels in the kW range), where improving environmental aspects of the metal-air battery may provide for significant gains in performance (e.g., energy conversion and storage at high efficiency). Also, the metal-air batteries may be used in smaller systems (power levels in the W range), where advances in consumer electronics provide opportunities for energy conversion and storage provided in a desirable size and having a relatively long lifespan.

The metal-air batteries of the disclosure may be used, for example, in hearing aids, headsets (e.g., Bluetooth or other wireless headsets), watches, medical devices, cameras, portable music players, laptops, phones (e.g., cellular phones), toys, and portable tools. Metal-air flow batteries can provide energy storage and conversion solutions for peak shaving, load leveling, and backup power supply (e.g., for renewable energy sources such as wind, solar, and wave energy). The metal-air batteries of the disclosure may also be used to provide motive power for an electric vehicle (e.g., a hybrid-electric vehicle, plug-in hybrid electric vehicle, pure electric vehicle, etc.), to provide backup power for the battery (e.g., as a range-extender), to provide power for other vehicle electric loads such as the electronics, GPS/navigation systems, radios, air conditioning, and the like within the vehicle, and to provide for any other power needs within the vehicle.

The shape of the metal-air battery of the disclosure is not specifically limited as long as it has oxygen intake holes. The metal-air battery may be of any desired shape, such as cylindrical, prismatic, cubic, button-like, coin-like or flat. The metal-air batteries of the disclosure may form a form a battery pack, module, or system. The metal-air battery of the disclosure may be used as a secondary battery and may be used as a primary battery.

Some embodiments of the disclosure provide metal-air batteries that are able to be fully charge and fully discharged for at least about 20 cycles. In other embodiments, this stability may be maintained for more than about 50 cycles, more than about 100 cycles, more than about 200 cycles, more than about 240 cycles, more than about 500 cycles, more than about 750 cycles, or more than about 1000 cycles.

In certain embodiments, the high current densities may be achieved in the batteries of the disclosure. For example, in certain embodiments, the current density discharged is at least about 0.1 mA/cm$^2$, or at least about 0.5 mA/cm$^2$, or at least about 1 mA/cm$^2$, or at least about 2 mA/cm$^2$, or at least about 3 mA/cm$^2$, or at least about 4 mA/cm$^2$, or at least about 5 mA/cm$^2$, or at least about 10 mA/cm$^2$. In one embodiment, the current density is between about 1 mA/cm$^2$ and about 20 mA/cm$^2$, or about 1 mA/cm$^2$ and about 10 mA/cm$^2$, or about 3 mA/cm$^2$ and about 10 mA/cm$^2$, or about 5 mA/cm$^2$ and about 10 mA/cm$^2$, or about 5 mA/cm$^2$ and about 20 mA/cm$^2$, or about 5 mA/cm$^2$ and about 30 mA/cm$^2$.

The metal-air batteries and the methods described herein can be operated at a variety of pressures and temperatures, and a person of skill in the art would be able to optimize these conditions to achieve the desired performance. For example, in certain embodiments, the metal-air batteries and the methods of the disclosure are operated at a pressure in the range of about 0.1 atm to about 2 atm, or about 0.2 atm to about 2 atm, or about 0.5 atm to about 2 atm, or about 0.5 atm to about 1.5 atm, or or about 0.8 atm to about 2 atm, or about 0.9 atm to about 2 atm, or about 0.1 atm to about 1 atm, or about 0.2 atm to about 1 atm, or about 0.3 atm to about 1 atm, or about 0.4 atm to about 1 atm, or about 0.5 atm to about 1 atm, or about 0.6 atm to about 1 atm, or about 0.7 atm to about 1 atm, or about 0.8 atm to about 1 atm, or about 1 atm to about 1.5 atm, or about 1 atm to about 2 atm. In one particular embodiment, the metal-air batteries and the methods of the disclosure are ran at a pressure of about 1 atm. In other embodiments, the metal-air batteries and the methods of the disclosure are operated out at a temperature within the range of about 0° C. to about 50° C., or of about 10° C. to about 50° C., or of about 10° C. to about 40° C., or of about 15° C. to about 35° C., or of about 20° C. to about 30° C., or of about 20° C. to about 25° C., or at about 20° C., or at about 21° C., or at about 22° C., or at about 23° C., or at about 24° C., or at about 25° C. In one particular embodiment, the metal-air batteries and the methods of the disclosure are operated out at a temperature of about 20° C. to about 25° C.

The person of ordinary skill in the art will appreciate that the cathode materials described herein can be useful as electronic materials in other applications. Accordingly, another aspect of the disclosure is an electronic material that includes at least one transition metal dichalcogenide and an electrolyte in contact (e.g., in direct contact) with the transition metal dichalcogenides, the electrolyte comprising at least 1% (e.g., at least 10%, at least 20%, at least 30% or at least 50%) of an ionic liquid. The transition metal dichalcogenide can be in a solid phase that includes, for example, at least 10 wt %, at least 20 wt %, at least 50 wt % or at least 70 wt %, 10-99%, 20-99 wt %, 50-99 wt %, 10-95 wt %, 20-95 wt %, 50-95 wt %, 10-70 wt %, 20-70 wt %, 40-70 wt % or 70-99 wt % transition metal dichalcogenide. The ionic liquid and transition metal dichalcogenide can be as described with respect to any embodiment above. The electronic material can be as described with respect to any cathode material described herein.

The methods and devices of the disclosure are illustrated further by the following examples, which demonstrate that MoS$_2$ nanoflakes exhibit bi-functional catalytic activity for both the oxygen reduction reaction and the oxygen evolution reaction in the presence of the ionic liquid 1-ethyl-3-methylimidazolium tetrafluoroborate. The cyclic voltammetry results indicate that the performance of MoS$_2$ exceeds that of noble metals for both reactions when tested under identical experimental conditions. MoS$_2$ nanoflakes are also demonstrated to perform well in a lithium-O$_2$ battery system with high round trip efficiency, small discharge/charge polarization gap and good reversibility. However, these results are not to be construed as limiting the disclosure in scope or spirit to the specific details and procedures thereof.

Experimental Methods

MoS$_2$ nanoflakes synthesis: MoS$_2$ nanoflakes were synthesized using a modified liquid exfoliation method. In brief, 300 mg MoS$_2$ powder (Alfa Aesar) was dispersed in 60 mL isopropanol and sonicated for 20 hrs using a sonication probe (Vibra Cell Sonics 130W).

MoS$_2$ characterization: The morphology of the MoS$_2$ nanoflakes was visualized at micro and atomic scales by performing scanning transmission electron microscopy (STEM) and scanning electron microscopy (SEM) experiments. STEM experiments were performed using a probe-corrected JEOL JEM-ARM200CF equipped with a 200 kV cold-field emission gun. The MoS$_2$ nanoflake images were acquired in either high or low angle annular dark field (H/LAADF), with the former providing an approximately Z$^2$ contrast, while the latter was more sensitive to lower angle scattering. A 14 mrad probe convergence angle was used for imaging, with the HAADF and LAADF detector angles set to 54-220 and 24-96 mrad, respectively. For STEM experiments, droplets of MoS$_2$ nanoflakes in dilute solution were directly deposited on QUANTIFOIL® R 2/1 holey films with 2 μm circular holes by copper grid (200 mesh, purchased from the Electron Microscopy Sciences). To remove any organic contamination, samples were carefully washed with deionized water and dried at 120° C. in vacuum. The intensity line profile was attained by using Gatan Digital Micrograph. Both the Web Electron Microscopy Applications Software (WebEMAPS) and CrystalMaker Software programs were also employed to generate and visualize the crystal structures schematically. SEM was performed in order to characterize the morphology of the $MoS_2$ nanoflakes deposited electrode at micro scale. A Raith e-LiNE plus ultra-high resolution electron beam lithography system was used to perform SEM imaging. During imaging the samples were kept at a distance of 10 mm from the electron source and the voltage was kept at 10 kV. No particular types of preparation were implemented before imaging except drying at ambient temperature under vacuum.

Dynamic light Scattering (DLS) measurement: DLS particle size measurements were carried out using a NiComp ZLS 380 system at 25° C. The instrument included a 35 mW semiconductor laser with 670 nm emissions and a thermoelectric temperature control for samples. $MoS_2$ nanoflakes dispersed in isopropanol were used for DLS experiments. The typical error in DLS data was on the order of 5-8%.

Raman Spectroscopy: To detect the $MoS_2$ in-plane and out of plane phonon modes, Raman spectra were recorded by using a Renishaw Raman 2000 instrument. The spectrum was obtained by exposing $MoS_2$ nanoflakes deposited on a silicon substrate (without any particular treatment) to a 514 nm laser beam (Ar laser, power 10 mW and spot size 10 μm). For discharge product analysis of the $Li-O_2$ battery system, all samples were rinsed with dimethyl carbonate to wash off all impurities and directly placed in a custom-made cell, which was well-sealed before Raman spectroscopy experiments. Raman spectra were acquired with a HORIBA LabRAM HR Evolution confocal Raman microscope. The instrument was configured with a 785 nm laser source, 1200 g/mm grating, a Horiba Synapse OE CCD detector, and either a 50× or 100× objective. Laser powers at the sample were between 1-15 mW. Calibration was performed on a chip of Si(111) from Ted Pella. Integration times and averaging parameters were chosen to maximize signal-to-noise while minimizing any sample degradation.

Figure 3:
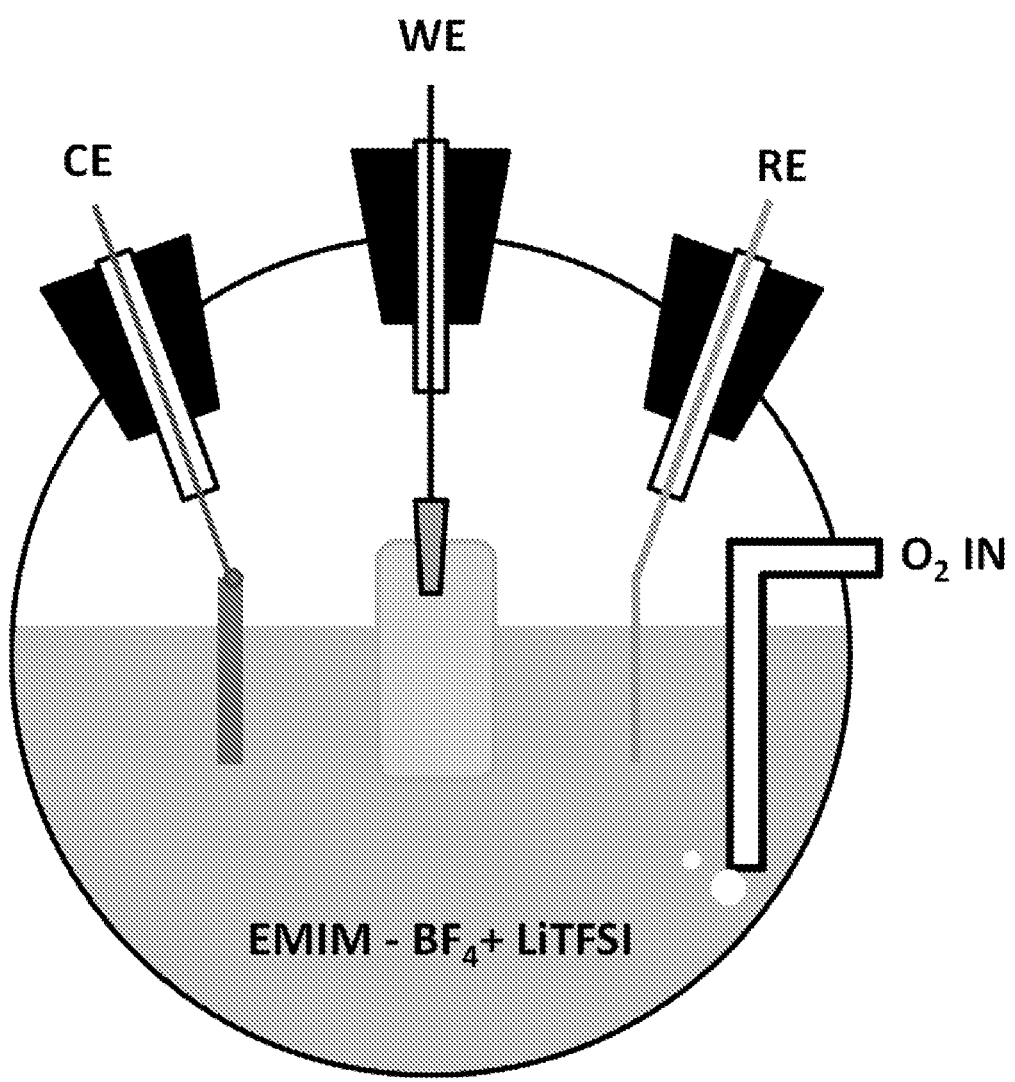
FIG. 3 is a schematic view of a three-electrode electrochemical cell used in the example experiments.

Electrochemical experiments: In order to study the catalytic activity of $MoS_2$ nanoflakes for the oxygen reduction reaction and the oxygen evolution reaction, electrochemical experiments were carried out in a standard three-electrode electrochemical cell. FIG. 3 is a schematic view of the three-electrode cell. The cell was composed of a working electrode (WE), a counter electrode (CE) and a reference electrode (RE) and were immerged in the electrolyte with 0.1 M lithium bis(trifluoromethanesulfonyl) imide (LiTFSI) as a lithium salt. The cell was properly sealed and connected to the potentiostat for electrolysis characterization. A Li wire (99.9% metal basis, Alfa Aesar) was used as counterelectrode. A 1 mm diameter glass tube is used for gas (argon or $O_2$) bubbling into the solution for the required time (e.g. 30-60 mins) based on a flow rate (~0.2-0.4 mL/min) using a mass flow controller (Sierra, calibrated for $O_2$ gas) to ensure the electrolyte was saturated with $O_2$ before the experiments. Oxygen bubbling was also continued during experiments along with stirring to minimize the effect of mass transfer. All experiments were performed in an Ar-filled glove-box. To prepare the cathode electrode, 0.3 mg of catalyst (depending on the experiment, synthesized $MoS_2$ nanoflakes, Pt nanoparticles and Au nanoparticles, each dispersed in isopropanol) were coated layer by layer onto a 1.5 $cm^2$ Toray carbon paper (TGP-H-030, purchased from FuelCellsEtc) as a gas diffusion layer (GDL) and dried in the vacuum chamber at 120° C. for 24 hrs. Lithium wire (99.9% metal basis, Alfa Aesar) was used as counter electrode. 1-Ethyl-3-methylimidazolium tetrafluoroborate (EMIM-$BF_4$), dimethyl sulfoxide (DMSO) and tetraethyleneglycol dimethylether (TEGDME) and lithium bis(Trifluoromethanesulfonyl) imide (LiTFSI) salt were purchased from Sigma-Aldrich. The applied voltage was swept between 2 and 4.2 V vs. Li/$Li^+$ with different scan rates. Cyclic voltammetry (CV) curve was then recorded using a Voltalab PGZ100 potentiostat (purchased via Radiometer Analytical SAS) calibrated with a RCB200 resistor capacitor box. The potentiostat was connected to a personal computer using Volta Master (version 4) software.

Figure 4:
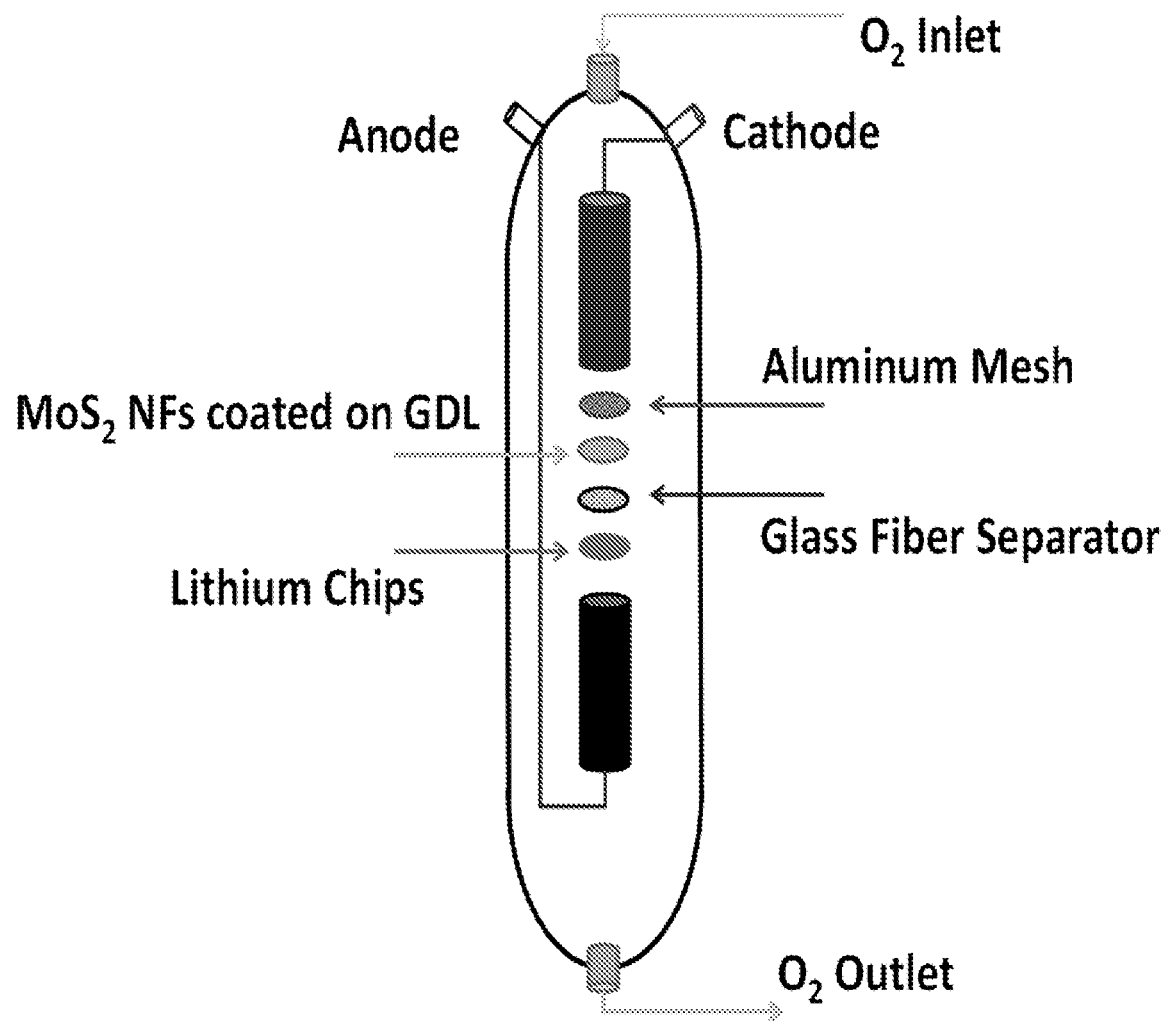
FIG. 4 is a schematic view of a Swagelok-style battery cell used in the example experiments.

Battery Experiments: All battery experiments were performed in a custom-made Swagelok type battery set-up. FIG. 4 is a schematic exploded view of the cell. The cell had $MoS_2$ nanoflakes deposited on a porous carbon gas diffusion layer as a cathode; lithium chips as an anode; aluminum mesh as both support and current collector, and a glassy carbon fiber filter paper saturated in EMIM-$BF_4$ electrolyte (HPLC grade, Sigma Aldrich) with 0.1 M LiTFSI as a lithium salt (battery grade, Sigma Aldrich). The glassy carbon fiber was used as a separator to avoid direct contact between cathode and anode. 0.3 mg of $MoS_2$ nanoflakes (dispersed in isopropanol) was coated layer by layer onto a 1.5 $cm^2$ gas diffusion layer (GDL) and dried inside a vacuum chamber at 120° C. for 24 hrs to remove all impurities. The battery set-up was assembled in an Ar-filled glove-box and transferred to a sealed $O_2$ chamber for electrochemical measurements. In order to eliminate the effect of parasitic reactions, the chamber was purged with pure $O_2$ to remove all gas impurities. The charging-discharging profile of assembled Li-air battery was investigated by performing galvanometric experiments at constant current density (e.g., 0.1 mA/g) to explore the electrochemical polarization gap. The battery capacity and cyclability examined by running charging-discharging experiments for different cycles (up to 50 cycles) at constant current rate.

X-ray diffraction (XRD) spectroscopy: To identify reaction products, XRD spectra were collected using a Rigaku ATX-G Thin-film Diffraction Workstation. Similar to the Raman spectroscopy experiments, all samples were rinsed with dimethylcarbonate to remove all impurities and placed in the well-sealed custom made cell before XRD experiments. A high intensity 18 kW copper x-ray rotating anode source was coupled to a multilayer mirror. The system had selectable x-ray optical configurations suitable for work with single crystal, thin-film or poly-crystalline film samples. The 2Theta-Omega scan for catalyst samples before and after the discharge process was carried out and recorded at angles between 20° and 80° using 0.05 width and 10 degree/min scan rate. Calibration and alignment scans were also performed to maximize the intensity of spectrum before measurements.

Energy-dispersive X-ray (EDX) Spectroscopy: EDX spectra were obtained on a FEI Quanta ESEM instrument with an integrated Oxford AZtec EDS system equipped with a Si(Li) detector. The maps were acquired at 15 kV acceleration voltage and 10 mm working distance. The oxygen map associated with the spectral peak at 523 eV was plotted.

Computational Details: To study the role of the ionic liquid (EMIM-$BF_4$) in the electrocatalytic reactions of a $Li-O_2$ battery using $MoS_2$ nanoflakes, especially for the formation of $O_2^{-*}$, density functional theory (DFT) calculations were carried out with plane-wave basis sets, which are implemented in the VASP package. A single-layer $MoS_2$ nanoribbon was used to simulate the interactions that occur on the Mo edges of $MoS_2$ nanoflakes. The supercell for the $MoS_2$ nanoribbon (cell lengths: 24.89 Å×56 Å×20 Å, cell angles: 90°×90°×60°) was constructed from an optimized $MoS_2$ unit cell (lattice constant 3.16 Å), including 40 Mo and 80 S atoms, with 8 Mo atoms on the Mo edge and 16 S atoms on the S edge of the nanoribbon. All the calculations were carried out using PAW PBE method, with a plane wave basis set up to kinetic energy cutoff of 400 eV. The calculations of the supercell systems were done with a 3×1×1 K-point grid. During the geometry optimizations, all the atoms in the system were allowed to relax, while the cell shape and volume were kept fixed. The calculations of the formation of $LiO_2$ and $Li_2O_2$ in $EMIM-BF_4$ were carried out using the implicit SMD solvation model developed exclusively for ionic liquids (see Bernales, V. S. et al., Quantum Mechanical Continuum Solvation Models for Ionic Liquids. *J. Phys. Chem. B* 116, 9122-9129 (2012)) account for the solvent effect of $EMIM-BF_4$. B3LYP/6-31 g (2 df) was used as the geometry.

$MoS_2$ Characterization

A scanning electron microscopy (SEM) image of as-synthesized $MoS_2$ NFs deposited on gas diffusion layer (GDL) substrate is provided as FIG. 5(a). The higher magnification of the SEM image (inset of FIG. 5(a), scale bar=100 nm) further demonstrates the surface morphology of the deposited catalyst, confirming that the $MoS_2$ nanoflakes were highly packed and randomly oriented. Dynamic light scattering (DLS) experiments were also performed to determine the size of as-synthesized nanoflakes. The DLS analysis of FIG. 5(b) indicates a substantially uniform size distribution of synthesized $MoS_2$ nanoflakes within a narrow size range (110-150 nm, ~1-10 layers thick) with an average flake size (i.e., along the major surface) of 135 nm. The inset of FIG. 5(b) provides the Raman spectrum of the synthesized flakes, which exhibits two distinct $MoS_2$ peaks between 300 and 500 $cm^{-1}$. The first peak at ~382 $cm^{-1}$ occurred due to the $E^1_{2g}$ phonon mode (in-plane) and the second peak at ~409 $cm^{-1}$ corresponded to the $A_{1g}$ mode (out of plane) of $MoS_2$.

The $MoS_2$ NFs were further characterized at atomic scale by performing high resolution scanning transmission electron microscopy (STEM) experiments. FIG. 5(c) is a low magnification low-angle annular dark field (LAADF) image of a $MoS_2$ nanoflake approximately 200×150 nm in size, supported on a lacey carbon film. A typical hexagonal selected area electron diffraction (SAED) pattern (upper right inset of FIG. 5(c)) taken from the same $MoS_2$ nanoflake reveals its defect free and single phase crystalline layer structure. Moreover, an intensity profile corresponding to a line drawn from the vacuum to the center on the imaged flake shows the steps associated with the mono-, bi and tri-layer $MoS_2$ (bottom inset of FIG. 5(c)). The edge state of a synthesized monolayer $MoS_2$ nanoflake was also imaged. As shown in FIG. 5(d), the edges of the $MoS_2$ nanoflake terminated along the (100) and (010) crystallographic planes, with Mo atoms making up the edges.

Next, electron energy loss spectra (EELS) of the sulfur L-edge on the plane structure of mono- and multi-layer flakes as well as for the edge of monolayer $MoS_2$ were acquired. Usually, the pre-peak intensity at 162 eV energy loss was associated with transitions from the S 2 $p^{3/2}$ initial states to the conduction band and scales with the density of available charge carriers. See FIG. 5(e). FIG. 5(f) shows the normalized peak intensity as a function of layers in $MoS_2$ and at the edge of the monolayer $MoS_2$. The results indicated a nearly 10-fold decrease at the Mo edge of the monolayer, while there was no noticeable difference as a function of $MoS_2$ layer away for the edge. This measurement provided a direct evidence for the remarkably high density of electrons at the Mo edges, which are is believed to be the responsible sites for the electrochemical reactions.

Electrochemical Characterization of the $MoS_2$/IL System

For electrochemical experiments, samples were prepared via layer-by-layer coating of synthesized $MoS_2$ nanoflakes onto a gas diffusion layer (GDL). Initially, the ORR and OER performance of $MoS_2$ nanoflakes was investigated in a standard three electrode electrochemical cell in which 0.1 M lithium bis(trifluoromethanesulfonyl) imide (LiTFSI) in ionic liquid (here, 1-ethyl-3-methylimidazolium tetrafluoroborate ($EMIM-BF_4$) was used as an electrolyte. The current densities, representing the oxygen electrode apparent activity, were normalized with respect to the geometrical surface area. FIG. 6(a) provides the cyclic voltammetry curves recorded in argon- and oxygen-saturated 0.1 M LiTFSI/$EMIM-BF_4$ electrolyte at 20 mV/s scan rate by sweeping the potential between 2.0 V to 4.2 V vs Li/$Li^+$ (in the present study, all potentials are reported based on Li/$Li^+$). These experiments were performed inside an argon-filled glove box. In the argon environment, $MoS_2$ nanoflakes exhibit merely a featureless curve in both ORR and OER regions, as shown in FIG. 6(a). In contrast, $MoS_2$ nanoflakes exhibit a maximum ORR apparent activity (current density of 10.5 mA/$cm^2$) at 2.0 V together with a remarkable OER (5.04 mA/$cm^2$) at 4.2 V in $O_2$-saturated ionic liquid.

Based on the recorded ORR and OER current densities and the comparison with previously reported catalyst performances, the $MoS_2$ nanoflakes/ionic liquid system provides an especially most efficient system for both ORR and OER. Here, it should be noted that high polarity and low value of ΔG (Gibbs free energy−61.7 kJ/mol) for the comproportionation reaction of $O_2^{2-}$ and $O_2$ to form $O_2^{-*}$ in ionic liquid can allow more stable intermediate complexes. Additionally, higher density of electrons on Mo edge atoms contributes to the observed superior ORR performance.

The maximum ORR and OER current densities were plotted against the square root of the scan rate to examine the reversibility of the reactions. As shown in FIG. 6(b), the ORR and OER current densities increase linearly with respect to the square root of the scan rate, indicating that both reactions are reversible in this system. The fact that the current density ratio ORR/OER remains constant with respect to the square root of the scan rate offers further evidence of the reversibility of the reactions.

In contrast, as shown in FIG. 6(c), the catalytic performance of the $MoS_2$ nanoflakes is relatively poor in dimethyl sulfoxide (DMSO) and tetraethylene glycol dimethyl ether (TEGDME), which are commonly used electrolytes in the Li—$O_2$ battery systems. In the case of $MoS_2$ nanoflakes/DMSO, only −0.75 mA·$cm^{-2}$ (ORR) and 1.2 mA·$cm^{-2}$ (OER) current densities were recorded at potentials of 2.0 and 4.2 V, respectively. The current density also remained lower than 0.5 mA·$cm^{-2}$ for both ORR and OER at the same potentials for the $MoS_2$ nanoflakes/TEGDME system. These results indicate a strong synergy of $MoS_2$ nanoflakes and the ionic liquid for both ORR and OER. The poor performance in DMSO and TEGDME is attributed to their smaller solvent acceptor numbers (AN) or polarities and high value of ΔG for the comproportionation reaction of $O_2^{2-}$ and $O_2$ to form $O_2^{-*}$, which prevents the formation of a stable $O_2$ intermediate.

To rule out the role of active edge atoms in ORR and OER, electrochemical experiments for $MoS_2$ nanoparticles were performed in the same experimental conditions. Similar sizes of $MoS_2$ nanoflakes and $MoS_2$ nanoparticles were selected to eliminate the size effect. FIG. 2(d) shows that $MoS_2$ nanoparticles exhibit 3 $mA/cm^2$ ORR and 1 $mA/cm^2$ OER current densities. At 2V and 4.2 V, the ORR and OER current densities of $MoS_2$ NFs are respectively more than three and five times higher than those of $MoS_2$ nanoparticles. ORR also begins at negligible overpotential (close to 2.96V) in $MoS_2$ nanoflakes in comparison to the large overpotential (0.5 V) observed for $MoS_2$ nanoparticles.

Figure 7:
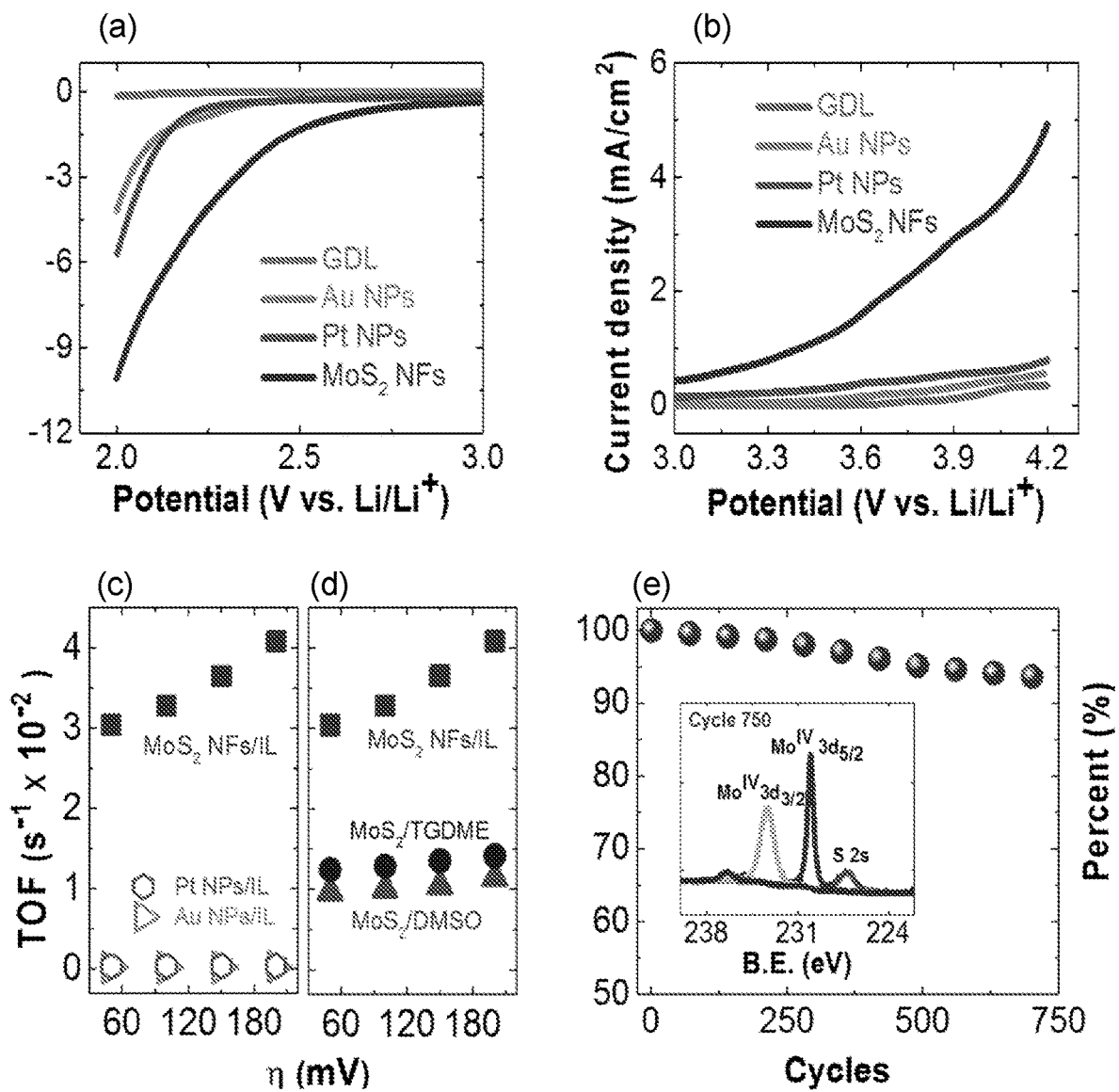
FIG. 7 illustrates the catalytic performance of $MoS_2$ nanoflakes and noble metals (Au and Pt) in ionic liquid. (a) Comparison of ORR for the bare gas diffusion layer, Au nanoparticles (Au NPs), Pt nanoparticles (Pt NPs) and $MoS_2$ nanoflakes. The top-to-bottom order of the traces at the left side of the plot is the same as in the legend. (b) Comparison of OER for the bare gas diffusion layer, Au nanoparticles (Au NPs), Pt nanoparticles (Pt NPs) and $MoS_2$ nanoflakes ($MoS_2$ NFs). The top-to-bottom order of the traces is $MoS_2$ nanoflakes, Pt NPs, Au NPs, GDL. (c) Turnover frequencies of platinum nanoparticles, gold nanoparticles, and $MoS_2$ nanoflakes in ionic liquid electrolyte over a small range of over-potentials (<200 mV). (d) Turnover frequencies of $MoS_2$ nanoflakes at different electrolytes i.e., DMSO, TGDME and IL over a small range of over-potentials (<200 mV). (e) Long-term performance of $MoS_2$ nanoflakes in ionic liquid. Only 6.8% loss in current density was observed after 750 cycles. The inset provides an elemental analysis of $MoS_2$ nanoflakes after 750 CV cycles by X-ray photoelectron analysis.

Additional electrochemical experiments with Pt (100 nm) and Au (120 nm) nanoparticles in $O_2$-saturated ionic liquid were performed under identical experimental conditions. FIG. 7(a) indicates that the ORR apparent activity of $MoS_2$ nanoflakes exceeds that of platinum nanoparticles (~7 $mA/cm^2$) and gold nanoparticles (4.5 $mA/cm^2$). It is also higher than previously reported for many other advanced catalysts such as metal oxides (e.g., $Mn_3O_4$) noble metals (e.g., Au and Pd), and doped or functionalized carbon nanomaterials (e.g., n-doped graphene). Additionally, the OER results shown in FIG. 7(b) clearly demonstrate the superiority of the $MoS_2$ nanoflakes over Pt and Au nanoparticles at all potentials ranging from a thermodynamic potential of 3.0 V up to 4.2 V. It is noted that at 4.2 V, the OER current density recorded for $MoS_2$ NFs (5.04 $mA/cm^2$) is more than one order of magnitude higher than those for Au nanoparticles (0.3 $mA/cm^2$) and Pt nanoparticles (0.5 $mA/cm^2$). At the same potential, this performance of $MoS_2$ NFs is also significantly higher than that of pervoskite nanoparticles (1.0 $mA/cm^2$) and highly active mesoporous perovskite nanowires (4.6 $mA/cm^2$).

The actual catalytic activities of the $MoS_2$ nanoflakes and the platinum and gold nanoparticles were also characterized based on their number of active edge sites using a roughness factor (RF). The calculated number of active sites in $MoS_2$ is much lower than those of Au and Pt. However, the turn over frequencies (TOFs) of $MoS_2$/ionic liquids for ORR have approximately two orders of magnitude higher values compared to Pt/IL and Au/IL catalysts for a wide range of over-potentials, as shown in FIG. 7(c). To explore the effect of solvent, similar calculations were performed for $MoS_2$ nanoflakes in different electrolytes i.e., ionic liquid, DMSO, and TGDME. As shown in FIG. 7(d), at the low range of over-potentials, more than three-fold higher TOFs were obtained in the ionic liquid electrolyte as compared to DMSO and TGDME. However, at high over-potentials approximately an order of magnitude higher TOF was obtained in ionic liquid than in the other electrolytes.

These results demonstrate that $MoS_2$ nanoflakes in ionic liquid is a highly active catalyst system for both ORR and OER.

To address the long term efficiency of the system, ORR and OER performance up to 750 cyclic voltammetry (CV) cycles (~22 hrs) was monitored, with an elemental analysis being performed afterward. FIG. 7(e) shows the ORR current density trend at 2 V. Only 6.5% loss in ORR current density was observed after 750 continuous CV cycles, which could be due to a decrease in Li salt concentration as a result of Li consumption. This suggests a remarkably high stability of our catalyst. The X-ray photoelectron spectroscopy (XPS) experiments performed on $MoS_2$ nanoflakes before the CV experiment and after 750 cycles (see inset of FIG. 7(e)) also confirms the stability of the catalyst. The XPS spectrum of $MoS_2$ nanoflakes obtained after 750 CV cycles consists of similar peaks with a small shift in the binding energy of the peak positions, which could be due to the presence of intercalated Li atoms or trivial variation in the $MoS_2$ phase state as reported previously. Nevertheless, the intensity of the $Mo^{6+}$ 3 $d_{5/2}$ peak (~236.4 eV) remains low, confirming that $MoS_2$ nanoflakes were not substantially oxidized during ORR and OER cycles.

Performance of the $MoS_2$ Nanoflakes/Ionic Liquid System in a Li—$O_2$ Battery

Figure 8:
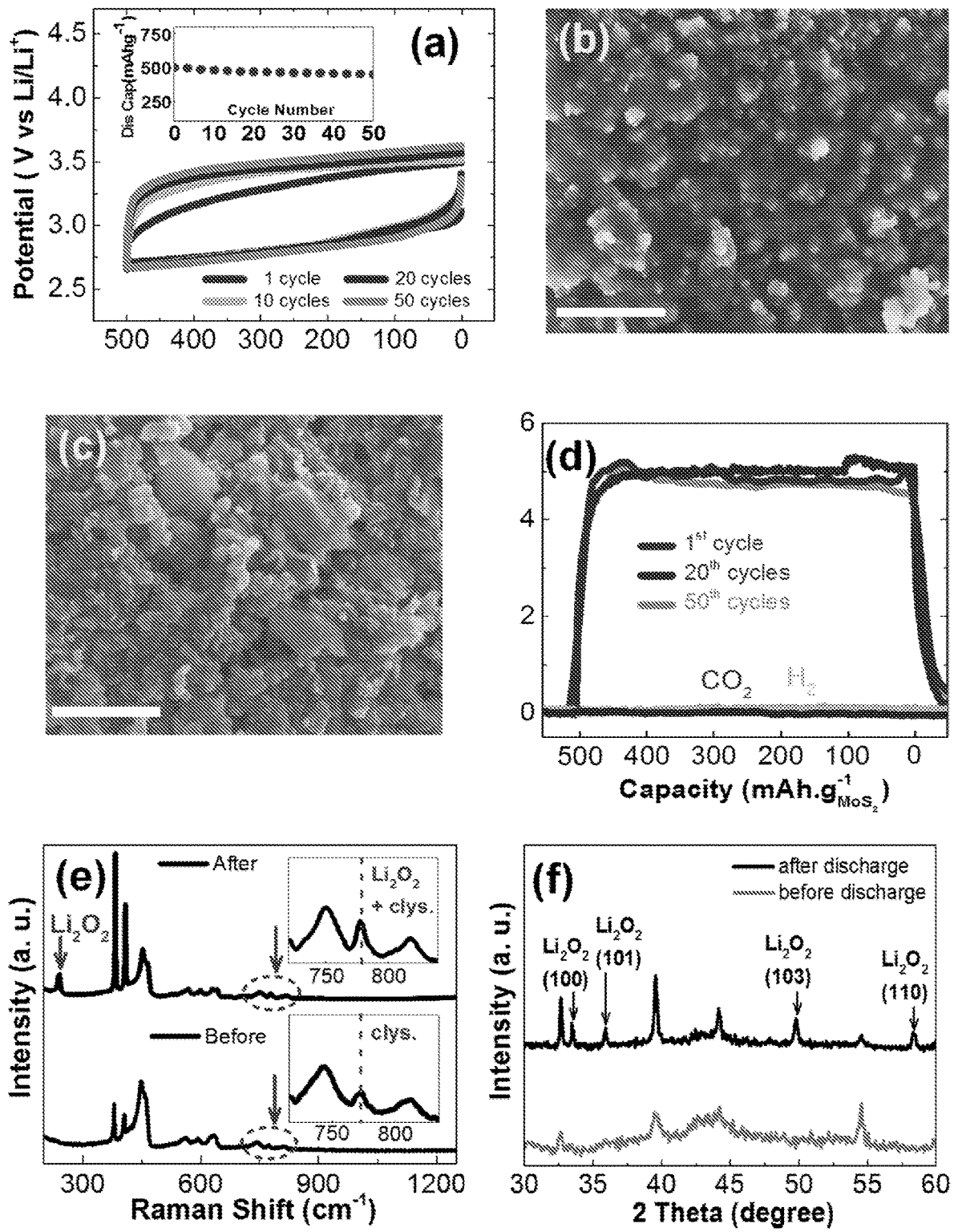
FIG. 8 shows the performance of bi-functional catalysts in Swagelok battery. (a) Charging and discharging voltage profiles of a battery using carbon free $MoS_2$ nanoflakes and ionic liquid electrolyte saturated with 0.1 M LiTFSI as a Li salt. The discharge capacity retention of the same co-catalyst based on 2.7 V cut-off potential versus number of cycles (inset) exhibits ~8% decay between 2 to 50 cycles. (b) SEM images of discharged cathode and (c) SEM images of pristine cathode. These two images show the film-like along with some nanoparticle morphology for $Li_2O_2$. Scale bars are 1 μm. (d) DEMS profiles of the cell after $1^{st}$, $20^{th}$ and $50^{th}$ cycles. DEMS data were collected during the charging process after the cell was discharged up to 500 mAh/g. The DEMS experiment demonstrates that $O_2$ gas is the only evolved gas during the whole charging process. (e) The Raman spectrum of the cathode surface before (bottom) and after (top) discharge. (f) XRD analysis of the discharged cathode before (bottom) and after (top) the discharge process.

The studies described above demonstrate high bi-functionality and long-term stability of the $MoS_2$ nanoflakes in a three-electrode electrochemical system. The $MoS_2$ nanoflakes/ionic liqud cathode/electrolyte system was next tested in a Li—$O_2$ battery. To examine this, a Swagelok cell (FIG. 4) was assembled, using 0.1 M LiTFSI in ionic liquid and a carbon-free (i.e., without using Super P or binder) $MoS_2$ nanoflake cathode. This configuration avoids any effect due to Super P carbon powder, which is also known as an active catalyst for Li—$O_2$ battery system. FIG. 8(a) provides the discharging and charging profiles of this $MoS_2$ nanoflakes/ionic liquid system as tested by capacity-limited (500 mAh/g) cycling up to 50 cycles at a current density of 0.1 mA/cm. The discharge (at the $1^{st}$ cycle) begins at 2.90, and targeted discharge capacity (500 mAh/g) was attained at potential 2.69 V. The charging process was also completed at a potential of 3.49 V.

Polarization gap is another important parameter for Li—$O_2$ batteries since a lower polarization gap results in higher round-trip energy efficiency. At 500 $mAh \cdot g^{-1}$ capacity (normalized to $MoS_2$ mass), the polarization gap for the $MoS_2$ nanoflakes/ionic liquid system was 0.8 V, which increases to 0.85 after 10 cycles. This is comparable with the gap of ~0.8 V reported for Au—Pt nanoparticle-based Li—$O_2$ batteries tested at a current density of 0.04 mA/cm (compared to 0.1 $mA/cm^2$ for the systems described herein). Moreover, the results for the $MoS_2$ nanoflakes/ionic liquid system is similar to that obtained for Pd nanoparticles deposited on $Al_2O_3$ passivated Super P carbon black. For the same capacity (500 mAh/g), the polarization gap for the Pd based catalyst increases during 10 cycles from 0.55 to 0.9 V. The $MoS_2$ nanoflakes/ionic liquid cathode/electrolyte system also has a lower polarization gap than that other systems such as TiC (1.25 V) and metallic mesoporous pyrochlore (1.5 V) based Li—$O_2$ batteries at their optimal experimental conditions.

FIG. 8(a) also shows the variation in the discharging and charging potentials as a function of the number of cycles. A small increment of the discharge (~20 mV) and charge potential (~120 mV) from the $2^{nd}$ cycle to the $50^{th}$ cycle suggests a reversible formation/decomposition of ORR products and high stability of the $MoS_2$ nanoflakes/ionic liquid system. Moreover, the discharge capacity retention of the $MoS_2$ nanoflakes/ionic liquid system based on a 2.7 V cut-off potential is ~8% between the $2^{nd}$ and $50^{th}$ cycles. This co-catalyst system also shows remarkably high round trip efficiency (~85%) for the $1^{st}$ cycle, which drops slightly to ~80% after 50 cycles. The failure after 50 cycles is likely due to the corrosion of the lithium anode from $O_2$ crossover as the anode was black after 50 cycles.

The deeper discharge and charge performance was also compared with with Au and Pt nanoparticles in the same electrolyte. The results indicate fully reversible discharge and charge for the $MoS_2$ nanoflakes/ionic liquid system, where Au and Pt nanoparticles could only recharge 40% (~600 mAh/g) and 50% (~500 mAh/g) of their overall capacity (1450 and 1000 mAh/g respectively). Moreover, at 500 mAh/g capacity, approximately 1.0 V wider polarization gap has been observed for Au and Pt nanoparticles compared to the $MoS_2$ nanoflakes/ionic liquid system. Additionally, the deeper discharge and charge experiments for the battery show that the of performance $MoS_2$ nanoflakes in ionic liquid is much higher than in DMSO. The results demonstrate almost 15 times higher capacity for $MoS_2$ nanoflakes/ionic liquid (~1250 mAh/g) than that of $MoS_2$ nanoflakes/DMSO (~85 mAh/g). This can be attributed to superior activity and reversibility of $MoS_2$ nanoflakes in ionic liquid electrolyte is consistent with our CV results.

In order to investigate the morphology of the discharge products in the $MoS_2$ nanoflakes/ionic liquid system, SEM of the cathode surface was performed before and after the discharge process (FIGS. 8(b) and (c)). The SEM images exhibited film-like properties along with some nanoparticle morphology on the surface. Energy-dispersive X-ray (EDX) $O_2$-phase image of a discharged cathode further confirms the existence of oxygen-enriched accumulated particles over the cathode surface.

Next, differential electrochemical mass spectroscopy (DEMS) experiments were performed for the $1^{st}$, $20^{th}$ and $50^{th}$ charging processes by applying 0.1 mA·cm$^{-2}$ current density and quantifying the product. FIG. 8(d) exhibits an immediate rise in $O_2$ signal confirming the evolution of $O_2$ molecules as a result of discharge product ($Li_2O_2$) decomposition. However, signals for $H_2$ and $CO_2$ remain small and unchanged. These results were observed for the entire charging process until the cutoff capacity (500 mAh/g) was reached. Additionally, the calculated charge-to-mass ratios (~2 e$^-$/$O_2$) remain almost constant during the $1^{st}$ $20^{th}$ and $50^{th}$ charging processes with ±4% variation with respect to the first cycle. These results indicate not only $Li_2O_2$ decomposition is occurring during the charge process, but also high cyclability and stability of the $MoS_2$ nanoflakes/ionic liquid-based Li—$O_2$ battery up to 50 cycles. Calculations also indicate that 83.8 μg $Li_2O_2$ was produced during the discharge process, which is very close to its theoretical value (86 μg), again confirming the $Li_2O_2$ as the main discharge product.

Raman spectroscopy was performed at the end of the $1^{st}$ discharge cycle and $1^{st}$, $20^{th}$ and $50^{th}$ charge cycles to further study the stability and cyclability of the cell. FIG. 8(e) provides the Raman spectrum of the cathode before and after the discharging process, normalized to the graphitic G band peak. A new peak at 250 cm$^{-1}$ associated with the $Li_2O_2$ is clearly seen in the spectrum of the discharged cathode. However, the second characteristic peak of $Li_2O_2$ at 788 cm$^{-1}$ interferes with a catalyst peak at the same position, but its intensity appears to be greater than that of undischarged cathode. Additionally, no peak was observed for $LiO_2$ (1123 cm$^{-1}$) as an intermediate product, or $Li_2CO_3$ (1088 cm$^{-1}$) in the Raman experiment. Similar results were obtained after the $20^{th}$ and $50^{th}$ charge cycles.

X-ray diffraction (XRD) analyses of a pristine and discharged cathode surface were also carried out to further clarify the crystal structure of the product; results are provided in FIG. 8(f). The XRD spectrum exhibits sharp peaks at 33°, 35°, 49° and 58° which correspond to the (100), (101), (103) and (110) crystal surfaces of $Li_2O_2$, respectively. The peaks completely disappeared after the $1^{st}$ charge cycle. These results were also repeated for the $20^{th}$ and $50^{th}$ cycles further confirming (i) the $Li_2O_2$ formation and its complete decomposition as the main discharge product, and (ii) the high cyclability and stability of the cell after 50 cycles.

Density Functional Calculations

Density functional theory (DFT) calculations were performed to provide a mechanistic understanding of the $MoS_2$/ionic liquid system during discharge. Previous studies have suggested that the first step in the discharge product formation for Li—$O_2$ batteries involves the oxygen reduction at the cathode:

$$O_2 + * \rightarrow O_2^* \text{ (cathode)} \qquad (1)$$

$$e^- + O_2^* \rightarrow O_2^{-*} \text{ (cathode)} \qquad (2)$$

where the initial reaction on the cathode is $O_2$ binding onto the surface of the electrode followed by reduction to form an adsorbed species $O_2^-*$ (Equations 1,2). There are various possible reaction steps that can occur following oxygen reduction. One scenario is that the initial oxygen reduction is followed by reaction with Li$^+$ cations and another electron transfer all occurring on the cathode surface with resulting growth of $Li_2O_2$. Another scenario is based on a through-solution mechanism where the $O_2^-$ desorbs into the electrolyte and solution phase reactions result in the discharge product formation. In this scenario $Li_2O_2$ can form by disproportionation (Equation 3) of $LiO_2$ either in solution or on the surface.

$$2LiO_2 \rightarrow Li_2O_2 + O_2 \qquad (3)$$

The formation of $O_2^-*$ (equations (1) and (2)) is important in determining the rate at which oxygen reduction occurs and thus the efficiency of the discharge process. Therefore, in this computational study the focus was upon $O_2^-*$ formation on the $MoS_2$ nanoflakes using DMSO and ionic liquids as electrolytes to provide insight into the experimental results.

Figure 5:
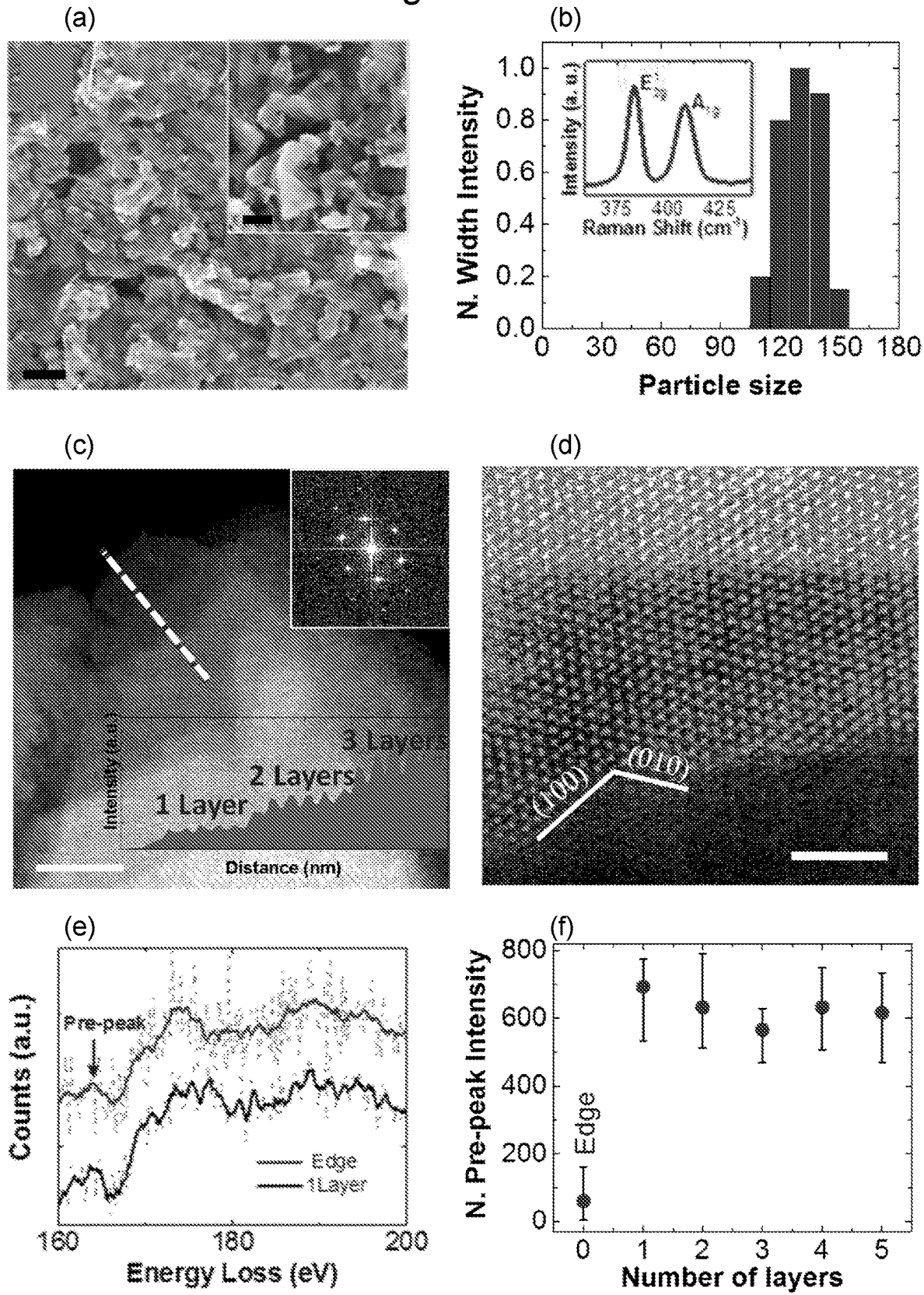
FIG. 5 presents structural and elemental analyses of synthesized $MoS_2$ nanoflakes. (a) SEM images of $MoS_2$ nanoflakes deposited on a gas diffusion layer (GDL) (inset scale bar, 100 nm) (b) Dynamic light scattering (DLS) particle size measurements and Raman spectrum of $MoS_2$ nanoflakes deposited on a gas diffusion layer (GDL). (c) Low magnification Low-angle annular dark field (LAADF) scanning transmission electron microscopy (STEM) image of a $MoS_2$ nanoflake approximately 200×150 nm in size, supported on a lacey carbon film (scale bar, 50 nm), with corresponding line profile along to the red dotted line (inset bottom), and selected area electron diffraction (SAED) pattern (inset upper-right corner). (d) High resolution STEM image of $MoS_2$ nanoflake edges (scale bar, 2 nm); the edges of the $MoS_2$ nanoflakes are terminated along the (100) and (010) crystallographic planes, with the Mo atoms making up the edge of the $MoS_2$ monolayers. (e) Electron energy loss spectra (EELS) of the sulfur L-edge on the plane (top) and edge of monolayer $MoS_2$ (bottom). (f) The normalized pre-peak intensity as a function of layers in $MoS_2$ and at the edge of the monolayer $MoS_2$.
Figure 9:
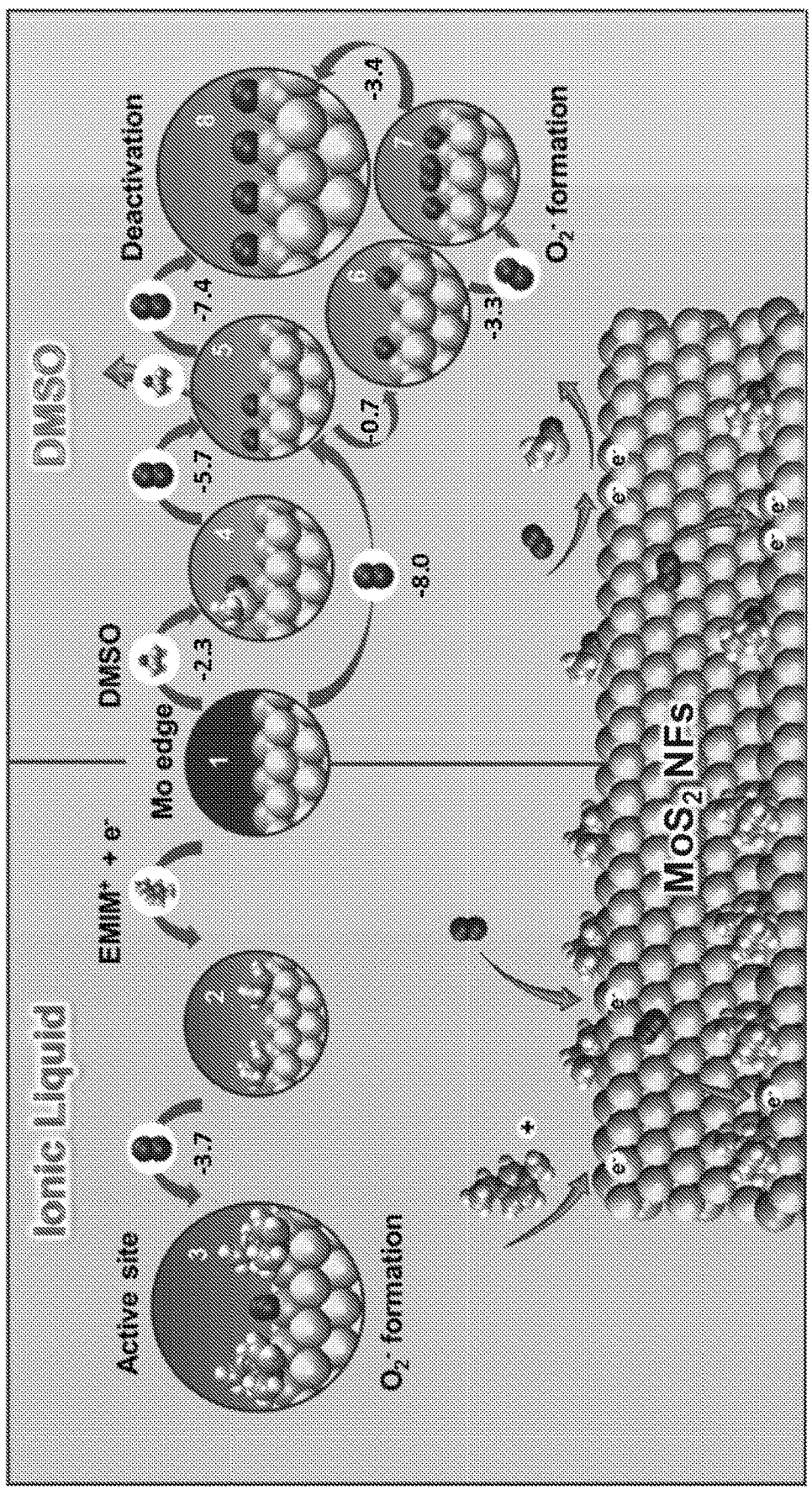
FIG. 9 provides a schematic illustration of the oxygen reduction reaction (ORR) on $MoS_2$ nanoflakes in two different electrolytes (ionic liquid ($[EMIM^+][BF_4^-]$) and DMSO) based on density functional theory (DFT) calculations. In the ionic liquid electrolyte, $EMIM^+$ ions bind strongly to the negative charged Mo edge (state 1) and form an $EMIM^+$-covered Mo edge, leaving single-atom Mo sites exposed to the solvent (state 2). Then $O_2$ binds onto the single-atom Mo sites and with charge transfer forms $O_2^-$ (state 3). However, in DMSO electrolyte, the neutral DMSO molecules only binds weakly to the Mo edge (state 4), and leaves multi-atom Mo sites exposed to the solvent. An $O_2$ molecule can either replace an adsorbed DMSO molecule on the Mo edge or bind directly on the multi-atom Mo sites, and rapidly dissociate to two bound O atoms on the Mo edge (state 5). In some cases, the dissociated O atoms may rearrange on the Mo edge, and form an active binding site (state 6), and $O_2$ can be reduced to $O_2^-$ on this site (state 7). However, continued $O_2$ dissociation on the Mo edge is thermodynamically favorable and will eventually lead to a highly stable oxidized Mo edge (state 8), which is deactivated. (The numbers in the figures are reaction energies, eV).

The reaction pathways of $O_2$ adsorption on $MoS_2$ nanoflakes in presence of DMSO or ionic liquid are shown in FIG. 9. As shown in this figure, in the DMSO electrolyte adsorption of an $O_2$ molecule onto the exposed Mo edge of $MoS_2$ flake (modeled as a $MoS_2$ nanoribbon) leads to the direct dissociation of the $O_2$ molecule to form two bound O atoms on the Mo edge, with no barrier (FIG. 9, state 5 or 6). This dissociative adsorption reaction is highly favorable, with a calculated adsorption energy of −8.0 eV. Based on the calculations, continued dissociation of $O_2$ molecules would occur on the Mo edge, and ultimately lead to a fully oxidized Mo edge (FIG. 9, state 8). A highly stable, fully oxidized Mo edge will not bind additional $O_2$ molecules and, therefore, will not be very favorable for oxygen reduction. However, in some cases, where the Mo edge is only partially oxidized, the Mo edge can bind to additional $O_2$ molecules (FIG. 9, state 6), forming $O_2^-*$ with charge transfer (FIG. 5, state 7). Nevertheless, the thermodynamics will drive the reaction toward full oxidation of the Mo edge and poison the catalyst (FIG. 9, state 8).

On the other hand, using an ionic liquid as the electrolyte can effectively prevent $O_2$ from dissociating on the electrode (FIG. 9, states 1 to 3). Previously, both computational and experimental studies have shown that ionic liquid ions exhibit strong attractive interactions with an electrode surface under electrochemical conditions. In general, the cations of ionic liquids are attracted by the cathodes, while the anions are attracted by the anodes. In the present DFT studies, the (EMIM$^+$+e$^-$) pairs were added to the Mo edge to mimic the electrochemical adsorption of EMIM$^+$ on a $MoS_2$ electrode, and to keep the calculated systems neutral. The DFT calculations showed that the EMIM$^+$ ions are likely to bind to the $MoS_2$ flakes with the EMIM$^+$ ring parallel to the Mo edge, and each EMIM$^+$ ion binds to two Mo atoms. The calculated density of states shows strong interactions between an EMIM$^+$ ion and the Mo edge with the presence of an extra electron, which favors the Mo edge being largely covered by the EMIM⁺ ions during the discharge process. Due to randomness of adsorption process and steric repulsion of neighboring EMIM⁺ ions on the edge, gaps in the EMIM⁺ coverage result in isolated Mo atoms exposed on the edge. For $O_2$ dissociation to occur, however, each $O_2$ molecule requires at least two nearby Mo atoms. The isolated Mo sites (FIG. 9, state 2) would only lead to $O_2$ binding with no dissociation (FIG. 9, state 3), which forms $O_2^-*$. Based on these calculations, the strong electrostatic interaction between the ionic liquid (EMIM⁺ ions) and the $MoS_2$ flakes tend to prevent complete $O_2$ dissociation on the Mo edge, and lead to the formation of oxygen reduction sites, $O_2^-*$.

Figure 10:
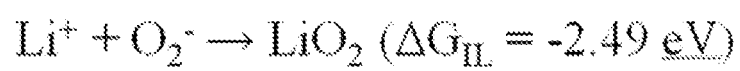
FIG. 10 is a diagram of the calculated reaction mechanism of the formation of $Li_2O_2$ in $EMIM-BF_4$ electrolyte (Reaction free energies, eV). $LiO_2$ is formed through ionic liquid solution by the interaction of dissolved $Li^+$ and $O_2^-$. $Li_2O_2$ is formed through the disproportionation of $LiO_2$ in ionic liquid.
Figure 10:
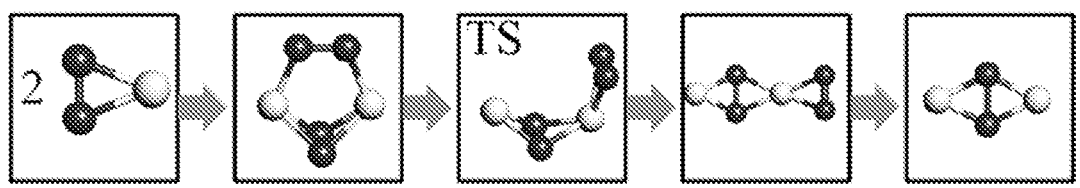
Figure 10:
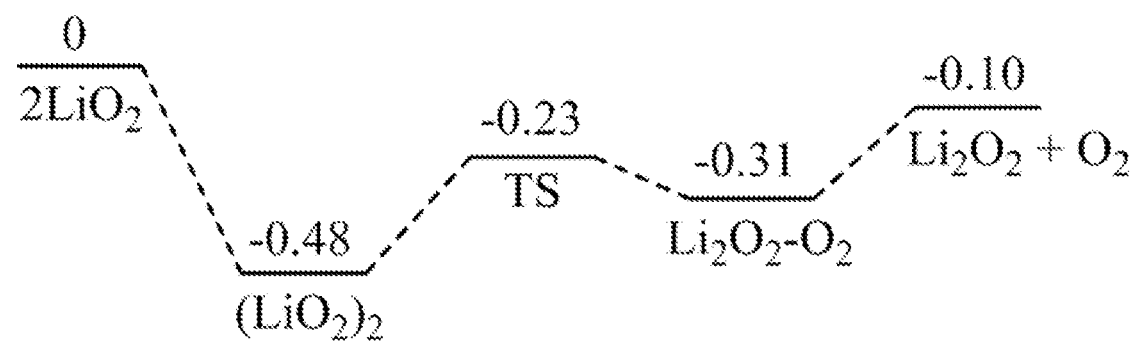

Following the formation of $O_2^-*$, the mechanism of the $Li_2O_2$ formation in the EMIM-$BF_4$ electrolyte was investigated. In a Li—$O_2$ battery based on $MoS_2$/ionic liquid the first scenario mentioned above, i.e., the surface growth mechanism, is not likely. The reason is that the catalyst active sites, the Mo edge atoms of the $MoS_2$ nanoflakes, would be blocked and deactivated by the growth of bulk $Li_2O_2$, which is very unlikely due to the excellent performance of the cell. On the other hand, the second scenario, i.e., the through-solution mechanism, is likely since it does not necessarily block catalytic sites. Thus, some of the steps in the second scenario were investigated with DFT calculations; other aspects such as nucleation and growth are beyond the scope of this study. The $O_2^-$ superoxide anion is calculated to be stabilized in EMIM-$BF_4$ by a large solvation energy (3.03 eV). This is also consistent with a high Gutman accepter number (AN) for EMIM-$BF_4$ (33.5), which indicates a high stability for $O_2^-$ in the ionic liquid solution. Therefore, after $O_2^-$ is formed on the catalyst active site, it can desorb into the EMIM-$BF_4$ electrolyte due to the strong solvation effect. The next step is the formation of solvated $LiO_2$ from solvated $Li^+$ and $O_2^-$ ($Li^+ + O_2^- \rightarrow LiO_2$) in the ionic liquid, which is calculated to be thermodynamically favorable with a reaction free energy of −2.49 eV. Then, two solvated $LiO_2$ molecules can form an $(LiO_2)_2$ dimer, with a dimerization energy of −0.48 eV (See FIG. 10). The $(LiO_2)_2$ dimer can disproportionate to form $Li_2O_2$ with a small barrier of 0.25 eV (FIG. 10). Because $Li_2O_2$ is not highly soluble, it is likely that $Li_2O_2$ then deposits by nucleation and growth on the electrode and further crystallizes. The DEMS results discussed above confirm that $Li_2O_2$ is the main product, which is consistent with the discharge mechanism modeled by the DFT calculations.

Thus, it is proposed that the $MoS_2$/ionic liquid combination acts as a co-catalyst whereby the ionic liquid promotes the catalytic properties of the $MoS_2$ nanoflakes by preventing oxidation of the edges and facilitating the dissolution of $O_2^-$. The formation of $Li_2O_2$ is likely to undergo a through-solution mechanism in this system. The poorer performance of the aprotic electrolytes, DMSO and TEGDME, confirms the synergistic effect predicted by theory for the $MoS_2$/ionic liquid combination.

SUMMARY

In summary, the experimental and theoretical studies described herein have demonstrated that a cathode based on molybdenum disulfide ($MoS_2$) nanoflakes combined with the ionic liquid EMIM-$BF_4$ worked together as an effective co-catalyst for discharge and charge in a Li—$O_2$ battery. Cyclic voltammetry results demonstrated superior reaction rates for this co-catalyst at lower overpotentials for oxygen reduction and evolution reactions compared to Au and Pt metal catalysts under identical experimental conditions. This $MoS_2$/ionic liquid co-catalyst also performed remarkably well in Li—$O_2$ battery system with a small discharge/charge polarization gap as well as good stability and cyclability. Atomic scale characterizations (STEM and EELS experiments) and DFT calculations were used to elucidate the mechanism by which the $MoS_2$ and the ionic liquid electrolyte act together to promote the catalytic properties of the $MoS_2$. It was demonstrated that the coverage of the Mo edge by the EMIM⁺ ions tended to form isolated Mo sites, which prevented $O_2$ dissociation and enable oxygen reduction. In addition, the ionic liquid facilitated dissolution of $O_2^-$, which led to formation of $Li_2O_2$ via a through-solution mechanism. The $MoS_2$/ionic liquid co-catalyst disclosed herein provided new opportunities for exploiting the unique properties ionic liquids such as their stability in Li-air batteries in combination with the activity of nanostructured $MoS_2$ as a cathode material.

It is understood that the examples and embodiments described herein are for illustrative purposes only and that various modifications or changes in light thereof will be suggested to persons skilled in the art and are to be incorporated within the spirit and purview of this application and scope of the appended claims. The person of ordinary skill in the art will appreciate that in certain aspects, the data presented here for the $MoS_2$/[EMIM-$BF_4$] system would be extendable to other transition metal dichalcogenides and/or other ionic liquids. All publications, patents, and patent applications cited herein are hereby incorporated herein by reference for all purposes.

We claim:
1. A metal-air battery comprising:
an anode comprising a metal;
a cathode comprising a material containing at least one transition metal dichalcogenide, in which each chalcogen is independently S, Se, or Te or a combination thereof, the transition metal dichalcogenide being configured as a catalyst for an oxygen evolution reaction during a charging operation of the metal-air battery and an oxygen reduction reaction during a discharging operation of the metal-air battery, wherein:
the transition metal dichalcogenide-containing material of the cathode includes at least 50 wt % of the at least one transition metal dichalcogenide, and
the transition metal dichalcogenide is
in nanoparticle form, having an average size between 1 nm and 1000 nm,
in nanoflake form, having an average thickness in the range of 1 nm to 100 nm, average dimensions along the major surface of 50 nm to 10 µm, and an aspect ratio of at least 5:1, or
in nanoribbon form, having an average width between 1 and 400 nm; and
an electrolyte in contact with the transition metal dichalcogenide-containing material of the cathode, and optionally with the metal of the anode,
wherein the electrolyte comprises at least 10% by weight of a co-catalytic ionic liquid having a cation having a positively-charged sulfur, phosphorus or nitrogen atom, and
wherein each transition metal dichalcogenide is provided in crystalline form terminated along the (100) and (010) crystallographic planes.

2. A metal-air battery according to claim 1, wherein the anode consists essentially of the metal.

3. A metal-air battery according to claim 1, wherein the metal of the anode is lithium.

4. A metal-air battery according to claim 1, wherein the transition metal dichalcogenide-containing material of the cathode includes at least 70 wt % transition metal dichalcogenide.

5. A metal-air battery according to claim 1, wherein the cathode comprises the transition metal dichalcogenide-containing material disposed on a porous member or a current collector.

6. A metal-air battery according to claim 5, wherein the porous member is in contact with oxygen in the gas phase.

7. A metal-air battery according to claim 5, wherein the porous member is electrically-conductive.

8. A metal-air battery according to claim 1, wherein each transition metal dichalcogenide is $TiX_2$, $MoX_2$ or $WX_2$, wherein each X is independently S, Se, or Te or a combination thereof.

9. A metal-air battery according to claim 1, wherein each transition metal dichalcogenide is $TiS_2$, $MoS_2$, or $WS_2$.

10. A metal-air battery according to claim 1, wherein each transition metal dichalcogenide is $MoS_2$.

11. A metal-air battery according to claim 1, wherein each transition metal dichalcogenide is in nanoparticle form, having an average size between about 1 nm and 1000 nm.

12. A metal-air battery according to claim 1, wherein each transition metal dichalcogenide is in nanoribbon form, having an average width between about 1 nm and 400 nm.

13. A metal-air battery according to claim 1, wherein the ionic liquid is 1-ethyl-3-methylimidazolium tetrafluoroborate.

14. A method of generating an electrical potential, comprising:
   providing a metal-air battery according to claim 1;
   allowing oxygen to contact the cathode;
   allowing the metal of the anode to be oxidized to metal ions; and
   allowing the oxygen to be reduced at a surface of the transition metal dichalcogenide to form one or more metal oxides with the metal ions, wherein the transition metal dichalcogenide acts as a catalyst for the reduction of the oxygen at the surface of the transition metal dichalcogenide,
   thereby generating the electrical potential between the anode and the cathode.

15. A metal-air battery according to claim 1, wherein the at least one transition metal dichalcogenide is selected from $VX_2$, $NbX_2$, $MoX_2$, $TaX_2$, and $ReX_2$, wherein each X is independently S, Se, or Te or a combination thereof, and wherein the transition metal dichalcogenide-containing material of the cathode includes at least 50 wt % of the at least one transition metal dichalcogenide.

16. A metal-air battery according to claim 1, wherein the electrolyte comprises at least 20% by weight of the ionic liquid.

17. A metal-air battery according to claim 1, wherein the transition metal dichalcogenide is selected from $TiX_2$, $VX_2$, $CrX_2$, $ZrX_2$, $NbX_2$, $MoX_2$, $HfX_2$, $WX_2$, $TaX_2$, $TcX_2$ and $ReX_2$, in which each X is independently S, Se, or Te or a combination thereof.

18. A metal-air battery according to claim 1, wherein the ionic liquid is an imidazolium salt, a pyridinium salt, a pyrrolidinium salt, a choline-based salt, an ammonium salt, a propulisoquinolinium salt, a benzamidine salt, a chloroformamidinium salt, a thiuronium salt, a phosphonium salt, or a sulfonium salt.

19. A metal-air battery according to claim 18, wherein an anion of the ionic liquid is anion is $C_1$-$C_6$ alkyl sulfate, tosylate, methanesulfonate, bis(trifluoromethyl sulfonyl)imide, hexafluorophosphate, tetrafluoroborate, triflate, halide, carbamate or sulfamate.

20. A metal-air battery according to claim 1, wherein the transition metal dichalcogenide is selected from $VX_2$, $NbX_2$, $MoX_2$, $WX_2$, $TaX_2$, and $ReX_2$, in which each X is independently S, Se, or Te or a combination thereof.

21. A metal-air battery according to claim 20, wherein the ionic liquid is an imidazolium salt, a pyridinium salt, a pyrrolidinium salt, a choline-based salt, an ammonium salt, a propulisoquinolinium salt, a benzamidine salt, a chloroformamidinium salt, a thiurnoium thiuronium salt, a phosphonium salt, or a sulfonium salt.

22. A metal-air battery according to claim 1, wherein the transition metal dichalcogenide is coated onto the cathode in a thickness of up to 1000 μm.

23. A metal air-battery according to claim 1, wherein the transition metal dichalcogenide is coated onto the cathode 1 to 10 layers thick.

* * * * *